United States Patent
Jia

(10) Patent No.: US 12,128,310 B2
(45) Date of Patent: Oct. 29, 2024

(54) VIRTUAL CHARACTER INTERACTION METHOD AND APPARATUS, COMPUTER DEVICE, AND STORAGE MEDIUM

(71) Applicant: Tencent Technology (Shenzhen) Company Limited, Shenzhen (CN)

(72) Inventor: Weixi Jia, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 222 days.

(21) Appl. No.: 17/891,998

(22) Filed: Aug. 19, 2022

(65) Prior Publication Data

US 2022/0410007 A1 Dec. 29, 2022

Related U.S. Application Data

(63) Continuation of application No. PCT/CN2021/102601, filed on Jun. 28, 2021.

(30) Foreign Application Priority Data

Aug. 12, 2020 (CN) .......................... 202010807260.5

(51) Int. Cl.
*A63F 13/56* (2014.01)
*A63F 13/67* (2014.01)
*A63F 13/795* (2014.01)

(52) U.S. Cl.
CPC .............. *A63F 13/56* (2014.09); *A63F 13/67* (2014.09); *A63F 13/795* (2014.09)

(58) Field of Classification Search
CPC ........ A63F 13/50; A63F 13/52; A63F 13/525; A63F 13/53; A63F 13/537; A63F 13/55;
(Continued)

(56) References Cited

U.S. PATENT DOCUMENTS 11,080,916 B1 * 8/2021 Baszucki ................ A63F 13/35
2017/0006322 A1 * 1/2017 Dury ..................... H04N 21/254
(Continued)

FOREIGN PATENT DOCUMENTS

CN 106774852 A 5/2017
CN 107376339 A 11/2017
(Continued)

OTHER PUBLICATIONS

Tencent Technology, ISR, PCT/CN2021/102601, Sep. 28, 2021, 2 pgs.

(Continued)

*Primary Examiner* — Omkar A Deodhar
(74) *Attorney, Agent, or Firm* — Morgan, Lewis & Bockius LLP

(57) ABSTRACT

Disclosed is a virtual character interaction method, including: displaying a viewing-only picture of a virtual character interaction scene; switching from the viewing-only picture to a virtual character simulation interaction interface in response to an interaction simulation operation triggered during displaying of the viewing-only picture; simulating, in the virtual character simulation interaction interface, virtual characters in the virtual character interaction scene, and displaying a scene status of interaction between the virtual characters, wherein the virtual characters include a simulated virtual character controlled by a user of the computer device; and controlling the simulated virtual character to perform a corresponding action in response to a control operation triggered on the virtual character simulation interaction interface by the user of the computer device.

20 Claims, 8 Drawing Sheets

(58) Field of Classification Search
CPC ........ A63F 13/56; A63F 13/57; A63F 13/573;
A63F 13/577; A63F 13/60; A63F 13/67;
A63F 13/69; A63F 13/70; A63F 13/795
See application file for complete search history.

(56) References Cited

U.S. PATENT DOCUMENTS

| | | | |
|---|---|---|---|
| 2018/0234496 A1* | 8/2018 | Ratias | H04L 67/535 |
| 2019/0255446 A1* | 8/2019 | Essiounine | A63F 13/87 |
| 2020/0009425 A1 | 1/2020 | Kim | |
| 2020/0034470 A1 | 1/2020 | Manoharan et al. | |

FOREIGN PATENT DOCUMENTS

| | | |
|---|---|---|
| CN | 109107167 A | 1/2019 |
| CN | 110519611 A | 11/2019 |
| CN | 111282284 A | 6/2020 |
| CN | 111443838 A | 7/2020 |
| CN | 111766950 A | 10/2020 |

OTHER PUBLICATIONS

Tencent Technology, WO, PCT/CN2021/102601, Sep. 29, 2021, 4 pgs.
Tencent Technology, IPRP, PCT/CN2021/102601, Feb. 7, 2023, 5 pgs.

\* cited by examiner

VIRTUAL CHARACTER INTERACTION METHOD AND APPARATUS, COMPUTER DEVICE, AND STORAGE MEDIUM

CROSS-REFERENCE TO RELATED APPLICATIONS

This application is a continuation application of PCT Patent Application No. PCT/CN2021/102601, entitled "VIRTUAL ROLE INTERACTION METHOD AND APPARATUS, COMPUTER DEVICE, AND STORAGE MEDIUM" filed on Jun. 28, 2021, which claims priority to Chinese Patent Application No. 202010807260.5, filed with the State Intellectual Property Office of the People's Republic of China on Aug. 12, 2020, and entitled "VIRTUAL CHARACTER INTERACTION METHOD AND APPARATUS, COMPUTER DEVICE, AND STORAGE MEDIUM", all of which are incorporated herein by reference in their entirety.

FIELD OF THE TECHNOLOGY

This application relates to the fields of computer technologies and artificial intelligence technologies, and in particular, to a virtual character interaction method and apparatus, a computer device, and a storage medium.

BACKGROUND OF THE DISCLOSURE

With the development of Internet technologies, users may view virtual character interaction scenes through the Internet. A virtual character interaction scene is a scene where virtual characters interact. For example, for e-sports competition scenes, users may view e-sports competitions online.

Currently, a user can only view a virtual character interaction scene displayed, but cannot process the viewed virtual character interaction scene. For example, the user can only view an e-sports competition, but cannot perform related operations on the viewed e-sports competition. In the conventional method, virtual character interaction scenes can only be viewed, which is too limited. Therefore, it is necessary to provide solutions to the problem that the conventional method is too limited.

SUMMARY

According to the embodiments provided in this application, a virtual character interaction method and apparatus, a computer device, and a storage medium are provided.

A virtual character interaction method is provided. The method is performed by a computer device, and includes:
  displaying a viewing-only picture of a virtual character interaction scene;
  switching from the viewing-only picture to a virtual character simulation interaction interface in response to an interaction simulation operation triggered during displaying of the viewing-only picture;
  simulating, in the virtual character simulation interaction interface, virtual characters in the virtual character interaction scene, and displaying a scene status of interaction between the virtual characters, wherein the virtual characters include a simulated virtual character controlled by a user of the computer device; and
  controlling the simulated virtual character to perform a corresponding action in response to a control operation triggered on the virtual character simulation interaction interface by the user of the computer device.

A virtual character interaction apparatus is provided, disposed in a computer device. The apparatus includes:
  a viewing module, configured to display a viewing-only picture of a virtual character interaction scene;
  a simulation interaction module, configured to switch from the viewing-only picture to a virtual character simulation interaction interface in response to an interaction simulation operation triggered during displaying of the viewing-only picture; and simulate, in the virtual character simulation interaction interface, virtual characters in the virtual character interaction scene, and display a scene status of interaction between the virtual characters, wherein the virtual characters include a simulated virtual character controlled by a user of the computer device; and
  a control module, configured to control the simulated virtual character to perform corresponding actions in response to a control operation triggered on the virtual character simulation interaction interface by the user of the computer device.

A computer device is provided, including a memory and a processor, the memory storing computer-readable instructions, and the processor, when executing the computer-readable instructions, implementing the operations in the virtual character interaction method according to the embodiments of this application.

One or more non-transitory computer-readable storage media are provided, storing computer-readable instructions, the computer-readable instructions, when executed by a processor, implementing the operations in the virtual character interaction method according to the embodiments of this application.

Details of one or more embodiments of this application are provided in the subsequent accompanying drawings and descriptions. Based on the specification, the accompanying drawings, and the claims of this application, other features, objectives, and advantages of this application become clearer.

BRIEF DESCRIPTION OF THE DRAWINGS

To describe the technical solutions in the embodiments of this application more clearly, the following briefly describes the accompanying drawings required for describing the embodiments. Apparently, the accompanying drawings in the following description show only some embodiments of this application, and a person of ordinary skill in the art may still derive other accompanying drawings according to the accompanying drawings without creative efforts.

DESCRIPTION OF EMBODIMENTS

To make the objectives, technical solutions, and advantages of this application clearer and more understandable, this application is further described in detail below with reference to the accompanying drawings and the embodiments. It is to be understood that the specific embodiments described herein are only used for explaining this application, and are not used for limiting this application.

Figure 1:
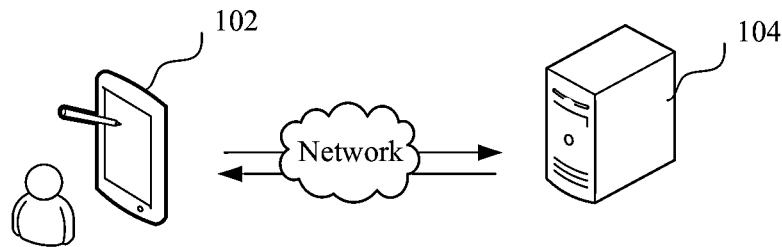
FIG. 1 is a diagram of an application environment of a virtual character interaction method in an embodiment.

A virtual character interaction method provided in this application may be applied to an application environment shown in FIG. 1. A terminal 102 communicates with a server 104 through a network. The terminal device 102 may be a smartphone, a tablet computer, a notebook computer, a desktop computer, a smart speaker, a smart TV, a smart wearable device (for example, a smart watch or smart glasses), or the like, but is not limited thereto. A client may be installed on the terminal device 102, which may be, for example, a video client, a game client, a browser client, or the like. The server 104 may be an independent physical server, or may be a server cluster including a plurality of physical servers or a distributed system, or may be a cloud server providing basic cloud computing services, such as a cloud service, a cloud database, cloud computing, a cloud function, cloud storage, a network service, cloud communication, a middleware service, a domain name service, a security service, a content delivery network (CDN), big data, and an artificial intelligence platform. The terminal 102 and the server 104 may be directly or indirectly connected in a wired or wireless communication manner. This is not limited in this application.

The terminal 102 may display a viewing-only picture of a virtual character interaction scene. A viewing user may trigger an interaction simulation operation when the terminal 102 displays the viewing-only picture, and the terminal 102 may switch from the viewing-only picture to a virtual character simulation interaction interface in response to the triggered interaction simulation operation. The terminal 102 may simulate, in the virtual character simulation interaction interface, virtual characters in the virtual character interaction scene, and display a scene status of interaction between the virtual characters. The viewing user may trigger a control operation on a virtual character in the virtual character simulation interaction interface, and the terminal 102 may control the simulated virtual character to perform a corresponding action in response to the triggered control operation.

It may be understood that, the terminal 102 may request the server 104 to allocate simulation interaction resources when receiving the interaction simulation operation, and according to the simulation interaction resources allocated by the server 104, the terminal 102 simulates, in the virtual character simulation interaction interface, virtual characters in the virtual character interaction scene, and displays a scene status of interaction between the virtual characters.

The virtual character interaction method in some embodiments of this application uses an artificial intelligence technology. For example, allocated virtual characters controlled by non-real users belong to intelligent robots trained using the artificial intelligence technology.

Artificial intelligence (AI) is a theory, method, technology, and application system that uses a digital computer or a machine controlled by a digital computer to simulate, extend, and expand human intelligence, perceive the environment, acquire knowledge, and use knowledge to obtain an optimal result. In other words, AI is a comprehensive technology in computer science and attempts to understand the essence of intelligence and produce a new intelligent machine that can react in a manner similar to human intelligence. AI is to study the design principles and implementation methods of various intelligent machines, to enable the machines to have the functions of perception, reasoning, and decision-making.

The AI technology is a comprehensive discipline, and relates to a wide range of fields including both hardware-level technologies and software-level technologies. The basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning/deep learning. It may be understood that, virtual characters controlled by non-real users in some embodiments of this application are equivalent to intelligent robot models trained using a machine learning technology.

Machine Learning (ML) is a multi-field interdiscipline, and relates to a plurality of disciplines such as the probability theory, statistics, the approximation theory, convex analysis, and the algorithm complexity theory. The machine learning specializes in studying how a computer simulates or implements a human learning behavior to obtain new knowledge or skills, and reorganize an existing knowledge structure, to keep improving performance of the computer. The machine learning, as the core of AI, is a basic way to make the computer intelligent, and is applicable to various fields of AI. The machine learning and deep learning generally include technologies such as an artificial neural network, a belief network, reinforcement learning, transfer learning, inductive learning, and learning from demonstrations.

Figure 2:
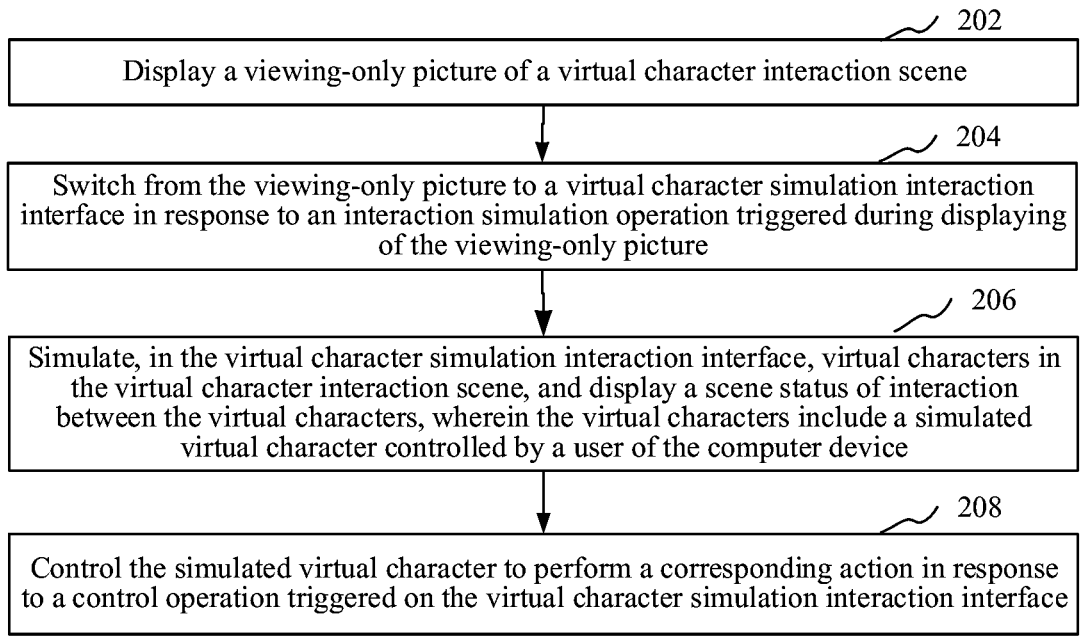
FIG. 2 is a schematic flowchart of a virtual character interaction method in an embodiment.

In an embodiment, as shown in FIG. 2, a virtual character interaction method is provided. The virtual character interaction method may be performed by a terminal, or may be performed jointly by a terminal and a server. In this embodiment of this application, the method being applied to the terminal in FIG. 1 is taken as an example for description. The method includes the following steps:

Step 202: Display a viewing-only picture of a virtual character interaction scene.

A virtual character is a virtualized character image used for interaction, which is different from a real image. A virtual character interaction scene is a scene where virtual characters interact. A viewing-only picture is a picture for viewing a virtual character interaction scene, that is, a picture for displaying the virtual character interaction scene for viewing.

The terminal in the embodiments of this application is a terminal used by the user viewing the virtual character interaction scene, that is, a viewing terminal. By executing the method in the embodiments of this application, the viewing user may use the viewing terminal to simulate the viewed virtual character interaction scene, to control the virtual characters in the virtual character interaction scene to interact. For example, a user viewing a live game may reproduce a viewed game scene and control a game character in the game scene using the viewing terminal by using the method of the embodiments of this application, to conduct interaction battles between game characters. In contrast, a streamer performing the live game uses a terminal for the live game to perform the method in the embodiments of this application during the live game. In an embodiment, at least one of the virtual characters is controlled by a real user. That is, some or all the virtual characters are controlled by real users for interaction. A real user is a user object that exists in the real world. It may be understood that, the remaining virtual characters are virtual characters controlled by non-real users. A virtual character controlled by a non-real user refers to a virtual character (for example, a robot model) that may interact without being controlled by a real user. In another embodiment, the virtual character may alternatively all virtual characters controlled by non-real users.

In an embodiment, the virtual characters may be any one or more types of images, for example, at least one of a character, an animal, or a plant. "A plurality of" refers to at least two. It may be understood that, the same virtual character interaction scene may include virtual characters of the same or different images.

In an embodiment, the virtual characters may be three-dimensional virtual characters or two-dimensional virtual characters. The virtual characters may be default virtual characters, or virtual characters generated by combining the default virtual characters with additional attributes (for example, purchased skins or equipment).

In an embodiment, the virtual character interaction scene may be a three-dimensional virtual space or a two-dimensional virtual space. The virtual character interaction scene may be a mobile game scene (that is, a mobile game scene), a terminal game scene, or a virtual character interaction scene in augmented reality, virtual reality (VR), or mixed reality (MR), but is not limited thereto.

Virtual reality is a new type of computer technology evolving from various information technologies such as computer vision and human-computer interaction, etc. With a display device, people can travel to be immersed in a completely virtual world by separating vision from a real world. Augmented reality is to overlay virtual information onto a specific position based on an identified object, in which virtual information can be exchanged in real time to enhance a visual effect. As a product of virtual reality and augmented reality, mixed reality is a new, interactive, and visual environment that combines a real world and a virtual, in which digital and physical objects coexist.

It may be understood that, in addition to the virtual characters, the virtual character interaction scene may further include a scene status of interaction between the virtual characters.

In an embodiment, the virtual character interaction scene may be a game scene, and game tasks are completed through interaction between various virtual characters. The game scene may be an e-sports game scene for professional e-sports players to conduct e-sports competitions, or may be a game scene for ordinary game users to play games. In another embodiment, the virtual character interaction scene may be alternatively another scene in which virtual characters are used for interaction, which is not limited. E-sports generally refers to electronic sports. Electronic sports is a sports event in which video game competitions reach the "competitive" level.

In an embodiment, the viewing-only picture may be a video viewing-only picture, or a battle viewing-only picture for entering an interaction room corresponding to the virtual character interaction scene to view the battle. The video viewing-only picture is a viewing-only picture displayed in the form of a video. It may be understood that, compared with the battle viewing-only picture, the video viewing-only picture is equivalent to broadcasting the virtual character interaction scene through the video, without requiring the user to enter the interaction room to view the battle. For example, in a game scene, the user may directly view game competitions on some video platforms that broadcast game competitions. In this case, pictures viewed by the user are video viewing-only pictures. If the user logs into a game application and enters a game battle room where a friend is playing a game to view the battle, it means that the user enters an interaction room corresponding to the virtual character interaction scene to view the battle.

In an embodiment, the video viewing-only picture may include at least one of a viewing-only picture played through a video file or a viewing-only picture of a live video. It may be understood that, the viewing-only picture played through the video file refers to a picture of the virtual character interaction scene viewed by the user by playing the formed video file. The viewing-only picture of the live video refers to a picture of the virtual character interaction scene viewed by the user through the live video in real time.

In an embodiment, the viewing-only picture is a scene picture viewed by the viewing user in which real users control virtual characters to interact. The viewing user is a user viewing the viewing-only picture. It may be understood that, the viewing user viewing the viewing-only picture is different from the real users controlling the virtual characters in the virtual character interaction scene. For ease of understanding, a description is made by using an example. For example, in an e-sports game scene, professional e-sports players (that is, real users) control game characters (that is, virtual characters) to conduct e-sports competitions, the video platform or game platform may broadcast the video of the e-sports competition, and ordinary viewing users may use terminals to view the e-sports competition (it may be understood that, the viewing users may view the live video of the game in real time, or view a video file of a recorded game process after the game is over). In this case, a picture of the e-sports competition viewed by the viewing users is a viewing-only picture of the virtual character interaction scene.

The "interaction" in the embodiments of this application is not limited to antagonistic interaction, and may also include collaborative interaction. For example, all the virtual characters in the virtual character interaction scene collaborate to complete a task, which is the collaborative interaction.

Step 204: Switch from the viewing-only picture to a virtual character simulation interaction interface in response to an interaction simulation operation triggered during displaying of the viewing-only picture.

The interaction simulation operation is an operation that triggers simulation of the interaction between the virtual characters in the virtual character interaction scene viewed. The interaction simulation operation does not refer to an interaction operation that triggers the currently displayed viewing-only picture. The "interaction" in the interaction simulation operation does not refer to human-computer interaction, but to the interaction between the virtual characters. That is, the interaction simulation operation is used for triggering simulation of the interaction between the virtual characters.

For example, viewing a competition of professional e-sports players is taken as an example. The professional e-sports players use six virtual characters, virtual character 1 to virtual character 6, to play the game. If a viewing user wants to control a game character in this game to simulate the battle when viewing a game picture of the professional e-sports players, the interaction simulation operation may be triggered. After the interaction simulation operation is triggered, a virtual character simulation interaction interface may be switched to, and the interaction (that is, the interaction between the six virtual characters in virtual character interaction scene) between the virtual characters in the virtual character interaction scene is simulated in the virtual character simulation interaction interface. It may be understood that, a case that a viewer manually triggers an interaction initiation event while viewing a game picture, for example, manually triggers a voting event, is a human-computer interaction operation rather than the interaction simulation operation in this application.

The virtual character simulation interaction interface is an interface for simulating the interaction between the virtual characters in the virtual character interaction scene. It may be understood that, the virtual character simulation interaction interface is not a picture in a viewing state, that is, not a picture for viewing, but an interface for viewing users to control virtual characters, to display the interaction between the virtual characters by controlling the virtual characters. The virtual characters controlled by the viewing users in the virtual character simulation interaction interface are virtual characters in the simulated virtual character interaction scene.

In an embodiment, an interaction simulation operation entrance (for example, a button or link for triggering the interaction simulation operation) may be set in the viewing-only picture, and the viewing user may trigger the interaction simulation operation entrance, thereby switching the viewing-only picture to the virtual character simulation interaction interface. In another embodiment, the interaction simulation operation may be alternatively triggered by operating an existing single key or combined keys, which is not limited.

When responding to the interaction simulation operation, the terminal may directly switch the viewing-only picture to the virtual character simulation interaction interface, or indirectly switch the viewing-only picture to the virtual character simulation interaction interface. That is, the terminal may first switch the viewing-only picture to a simulation interaction information setting interface or a simulation interaction information confirmation interface, and then switch to the virtual character simulation interaction interface through a user operation.

The terminal may switch from the viewing-only picture to the virtual character simulation interaction interface when responding for the first time to the interaction simulation operation, or may switch from the viewing-only picture to the virtual character simulation interaction interface when responding not for the first time to the interaction simulation operation. For example, the viewing user may switch back to the viewing-only picture from the virtual character simulation interaction interface. Subsequently, the viewing user may trigger the interaction simulation operation again, and the terminal may switch from the current viewing-only picture to the virtual character simulation interaction interface in response to the interaction simulation operation again.

It may be understood that, the viewing-only picture and the virtual character simulation interaction interface are interfaces that may be switched between each other and are displayed to the viewing user in different statuses. The viewing-only picture is a picture viewed by the viewing user in a viewing state, and the virtual character simulation interaction interface is an interface in which the viewing user is in a simulation interaction state and the user controls the virtual characters in the simulated viewing-only picture. In other words, the status of the viewing user is switched to implement the switching between the viewing-only picture and the virtual character simulation interaction interface. The interface switching between the two pictures with different content does not mean the viewing-only picture and the virtual character simulation interaction interface. For example, a game streamer performs different game operations according to voting results of the audience when broadcasting a game played, thereby displaying a game interface from interface 1 to interface 2. This case is not switching from a viewing-only picture to a virtual character simulation interaction interface. This is because this case is essentially always the game streamer (the game streamer is the party who plays the game to provide the game interface for the users to view, not a viewing user) in a game status generating different game interfaces through operations, that is, interface 1 and interface 2. The interfaces are different game interfaces of the game streamer in the same status, and are not interfaces displayed by the viewing users in different statuses. Moreover, in this case, switching back and forth between different game interfaces cannot be performed, which again proves that the interfaces are different from the viewing-only picture and the virtual character simulation interaction interface in this application.

Step 206: Simulate, in the virtual character simulation interaction interface, virtual characters in the virtual character interaction scene, and display a scene status of interaction between the virtual characters. In some embodiments, the virtual characters include a simulated virtual character controlled by a user of the computer device.

The scene status of the interaction between the virtual characters includes a status of a virtual character. The status of the virtual character is an interaction result of the virtual character. In an embodiment, the status of the virtual character may include at least one of a survival status, a level status, an equipment status, a skill status, an attack status, or a defense status.

In an embodiment, the scene status of the interaction between the virtual characters may further include a status of a virtual environment scene. The virtual environment scene is a virtual background environment where the virtual characters interact with each other. The virtual environment scene may include at least one of wild monsters, minions, grass, sky, land, ocean, buildings, or the like, but is not limited thereto.

In an embodiment, the scene status of the interaction between the virtual characters may change with the interaction between the virtual characters. That is, when the virtual characters interact with each other, the status of the virtual characters and the status of the virtual environment scene may change correspondingly. Taking a game scene as an example, a game character upgrades and purchases equipment during the game, and a blood volume thereof changes. These are all changes in the status of the game character, which are generated interaction results. In addition, a status of a background environment of the game may also change. For example, in a tower-pushing game, a defensive tower is knocked down or a monster image is destroyed. These are all changes in the status of the virtual environment scene.

Figure 3:
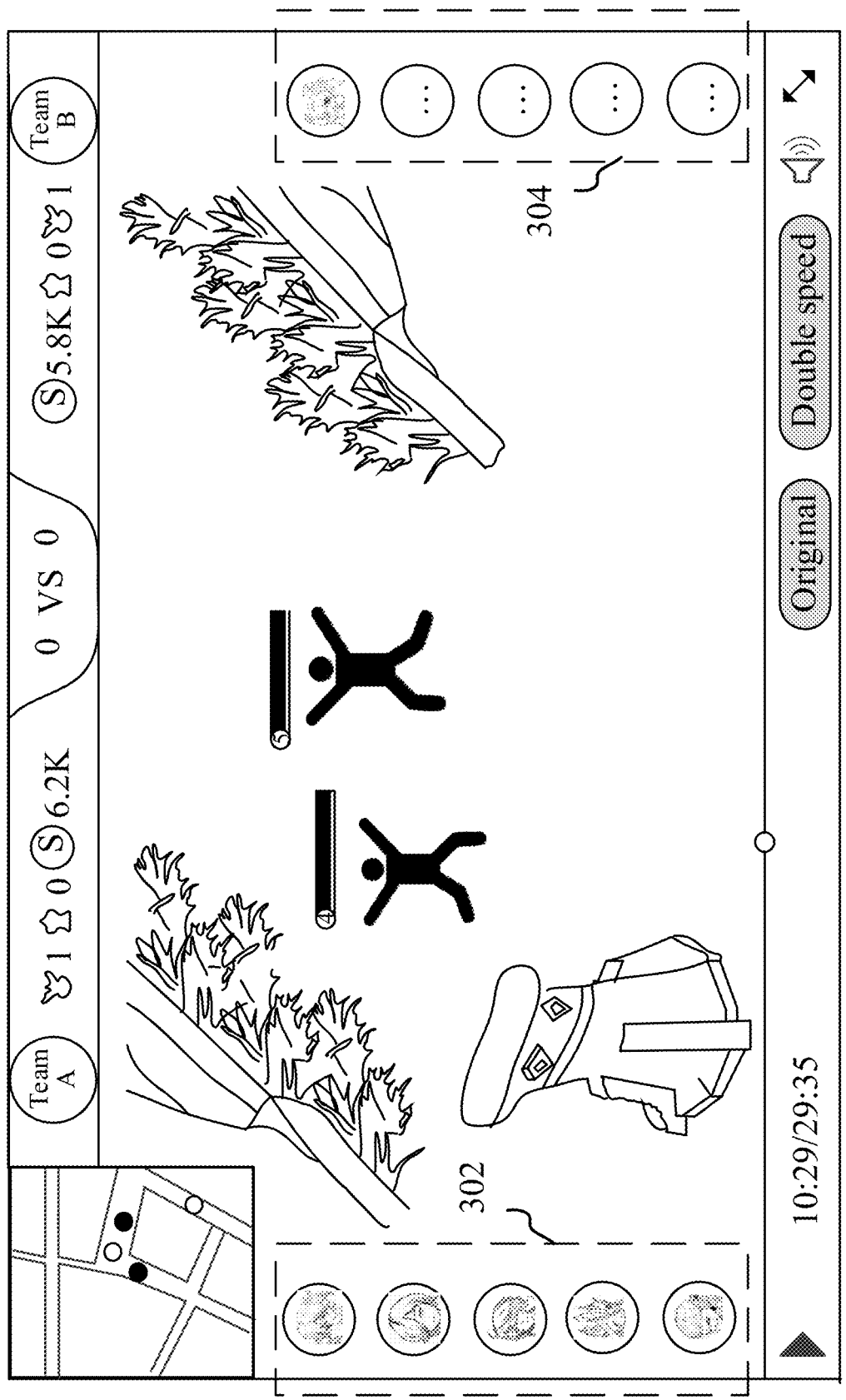
FIG. 3 is a schematic diagram of a viewing-only picture in an embodiment.
Figure 4:
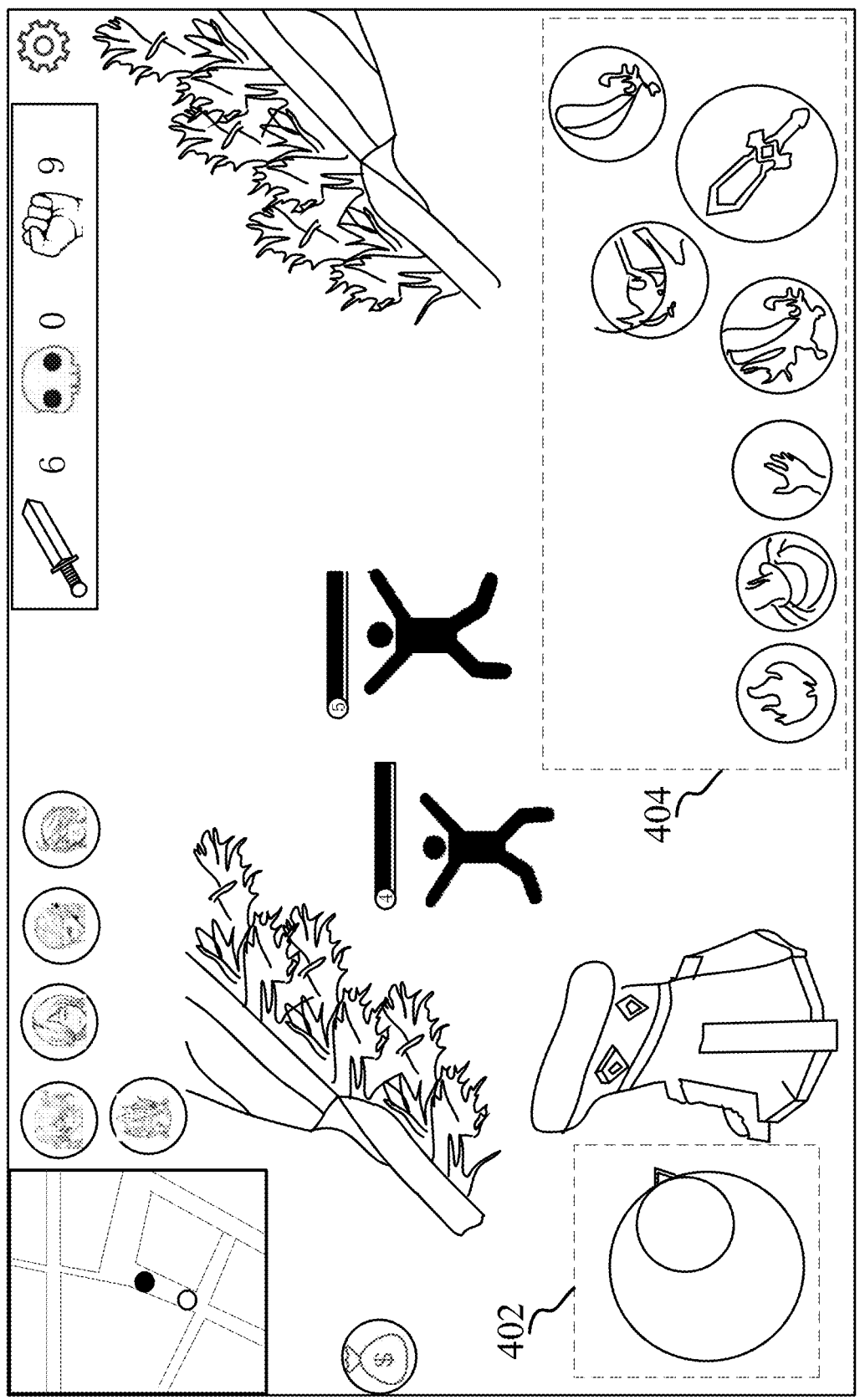
FIG. 4 is a schematic diagram of a virtual character simulation interaction interface in an embodiment.

For ease of understanding, a case of viewing an e-sports competition is taken as an example. FIG. 3 is a picture (that is, a viewing-only picture) of an e-sports competition viewed on a live video platform. FIG. 4 is a game picture of a simulated battle, that is, the user chooses to simulate and control a game character in a team A, to control the simulated game character in the team A in a game application. As can be seen from FIG. 3 and FIG. 4, the picture of the viewed e-sports competition is different from the picture of the simulated battle viewed by the user. In FIG. 3, it is equivalent to viewing a video on the e-sports livestreaming platform, and there is a picture of the e-sports competition in the video. In FIGS. 3, 302 and 304 are avatars of game characters used by team A and team B, respectively. FIG. 3 displays a current battle result of both sides of the game. Since FIG. 3 is a viewing-only picture, the interface of FIG. 3 is for viewing only, and there is no control for controlling the virtual characters. Since FIG. 4 is a game picture in which the user controls the game character to compete in the game application by simulating the viewed e-sports competition, FIG. 4 includes a movement control 402 and skill controls 404.

In FIG. 4, the user controls the game character in the game application to fight. FIG. 3 and FIG. 4 are only used to illustrate the difference between the viewing-only picture and the virtual character simulation interaction picture. The virtual character simulation interaction picture in FIG. 4 is not obtained by simulating the virtual character interaction scene in the viewing-only picture in FIG. 3, and is only an illustration of the virtual character simulation interaction picture.

In an embodiment, the displaying a scene status of interaction between the virtual characters includes: displaying an initialized scene status of the interaction between the virtual characters; or reproducing a scene status of the interaction between the virtual characters in the viewing-only picture.

The initialized scene status refers to an initialized scene status when the interaction between virtual characters has not started.

In an embodiment, in the virtual character simulation interaction interface, the terminal may display the initialized scene status of the interaction between the virtual characters. That is, the scene status in the virtual character interaction scene when the interaction simulation operation is triggered is not considered, and the display is based on the initialized scene status by default. Subsequently, the viewing user may control the simulated virtual character based on the initialized scene status.

In an embodiment, in the virtual character simulation interaction interface, the terminal may display the scene status of the interaction between the virtual characters in the viewing-only picture in the virtual character simulation interaction interface, to reproduce the scene status of the interaction between the virtual characters in the viewing-only picture. That is, the scene status in the virtual character simulation interaction interface is consistent with the scene status in the virtual character interaction scene when the interaction simulation operation is triggered (for example, based on the current game status of the viewed e-sports competition, a game battle is conducted). It may be understood that, reproducing the scene status in the virtual character interaction scene enables the user to simulate the interaction based on the currently viewed interaction status, which is equivalent to combining the viewing scene and the simulation interaction scene, thereby improving the interaction correlation, simulating the interaction more realistically, and improving the accuracy and interactivity of the simulation interaction.

In another embodiment, the scene status of the interaction between the virtual characters may be fixed. For example, for some question-answering scenes, during an entire interaction process, scene statuses of the entire interaction such as a status of a virtual background scene and a status of a virtual character do not change, and the outcome is ultimately determined by a number of points.

Step 208: Control the simulated virtual character to perform a corresponding action in response to a control operation triggered on the virtual character simulation interaction interface by the user of the computer device.

The control operation is an operation of controlling the simulated virtual character.

It may be understood that, switching from the viewing-only picture to the virtual character simulation interaction interface is equivalent to switching the viewing user from the viewing state to the simulation interaction state. Taking viewing an e-sports competition as an example, it is equivalent to switching the user from an e-sports competition viewing state to a status of simulating the e-sports competition and playing the game. The terminal that executes step 208 is the terminal used by the viewing user.

In this way, the viewing user may trigger the control operation on the simulated virtual character based on the virtual character simulation interaction interface, and the terminal used by the viewing user may control the simulated virtual character to perform the corresponding action in response to the control operation, thereby implementing control of the simulated virtual character by the viewing user, to implement simulation interaction. Still taking viewing an e-sports competition as an example, so that the viewing user can quickly switch to control the game character in the e-sports competition while viewing the e-sports competition, and the viewing user simulates the e-sports competition to play the game. It is the viewing user of the e-sports competition that switches to the game character simulation interface to control the simulated game character, not a streamer or an e-sports player who conducts the e-sports competition or livestreaming that controls the game character during the competition or livestreaming.

Figure 5:
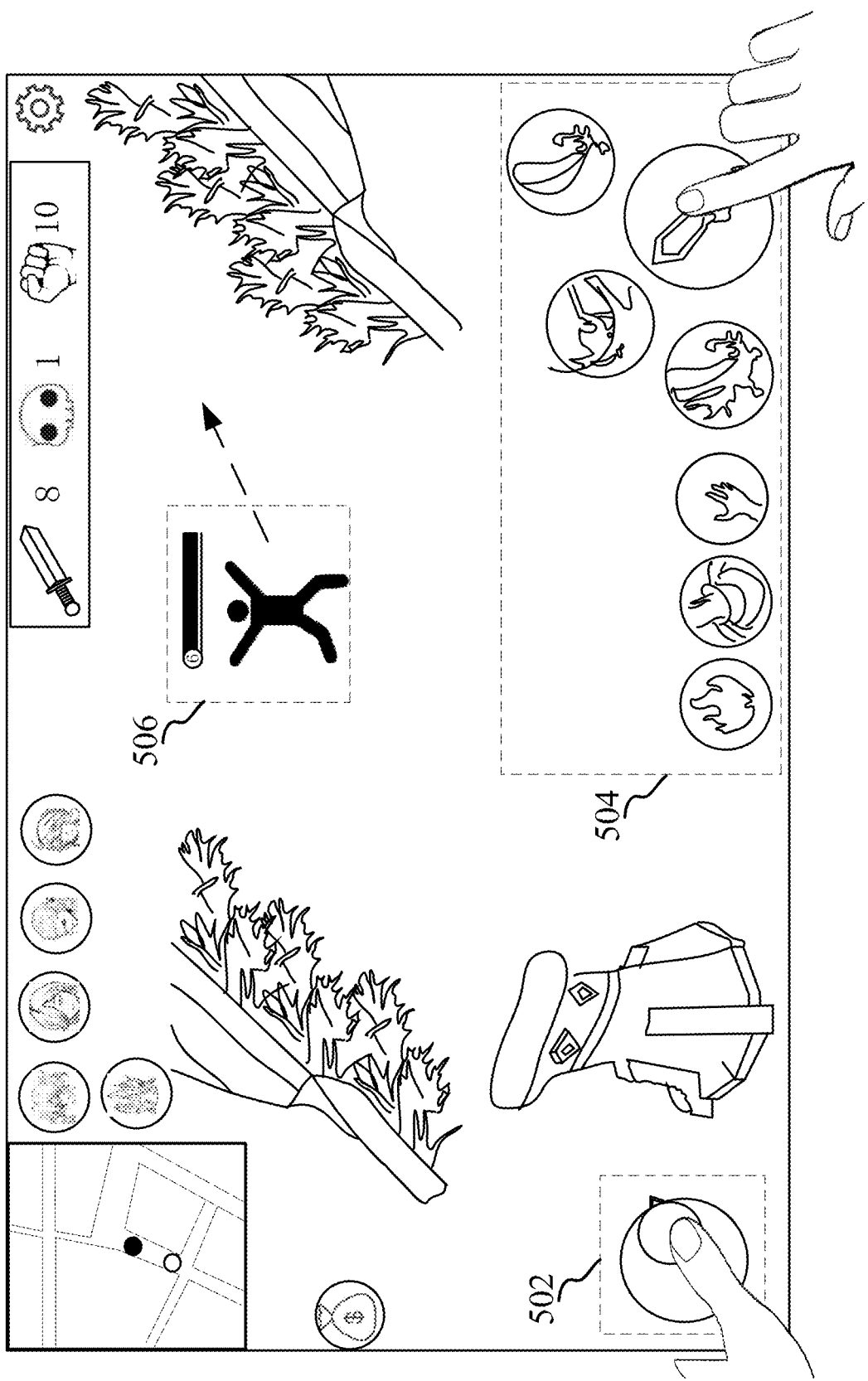
FIG. 5 is a schematic diagram of controlling virtual characters based on a virtual character simulation interaction interface in an embodiment.

FIG. 5 is a schematic diagram of controlling a simulated virtual character by a user in a virtual character simulation interaction interface. Referring to FIG. 5, the user may control a simulated game character 506 to move and fight by operating a movement control 502 and skill controls 504.

It may be understood that, when the viewing user does not want to simulate the interaction, but wants to return to view a virtual character interaction scene, a viewing return operation may be triggered when a virtual character simulation interaction interface is displayed. The terminal may respond to the viewing return operation and switch the virtual character simulation interaction interface back to the viewing-only picture. In an embodiment, the terminal may quickly switch the virtual character simulation interaction interface back to the viewing-only picture based on a 5G network (5G Network, fifth-generation mobile communication network).

When the viewing-only picture in step 202 is a pause picture, the terminal may switch the virtual character simulation interaction interface back to the viewing-only picture during pausing in response to the viewing return operation. The pause picture is a picture in which the progress can be paused. In an embodiment, the pause picture may include a viewing-only picture when a video file is played. For example, when a replay video of an e-sports competition is viewed, the video may be paused. The viewing user may then simulate the e-sports competition to simulate a battle game. When the user does not want to simulate a battle, the user may return to a viewing-only picture during pausing to continue viewing the replayed e-sports competition.

When the viewing-only picture in step 202 is a non-pause picture, the terminal may switch the virtual character simulation interaction interface back to a viewing-only picture of the virtual character interaction scene in the latest scene status in response to the viewing return operation. The non-pause picture may be a real-time picture. In an embodiment, the non-pause picture may include a viewing-only picture of a live video. For example, when viewing a live e-sports competition, the viewing user wants to simulate a battle. When the viewing user simulates an e-sports competition for a simulated battle game, the real live e-sports competition is still going on, so that the viewing-only picture changes. When the viewing user does not want to simulate a battle, the user may return to the latest live e-sports competition picture.

When the viewing user returns to view, simulation interaction resources previously in the virtual character simulation interaction interface may still be reserved. When the viewing user wants to perform simulation interaction for the second time, the terminal may directly obtain the simulation interaction resources, and enter the virtual character simulation interaction interface to perform simulation interaction. For example, after the viewing user returns to view the e-sports competition, the terminal may continue to save previously allocated battlefields (that is, simulation interaction room resources) and artificial intelligence sparring robots (that is, robot models representing opposing virtual characters) for the viewing user in the background, so that when the user wants to simulate a battle again next time, the user can quickly switch back to the battle state.

It may be understood that, when the user wants to perform simulation interaction again, the user may specify any moment in the virtual character interaction scene as a target time point for the start of the simulation interaction (for example, dragging the progress bar to the specified target time point). The terminal may display a scene status of the interaction between the virtual characters at the target time point in the virtual character simulation interaction interface according to the reserved and allocated simulation interaction resources and the target time point.

In an embodiment, the terminal or the server may recycle the previously allocated simulation interaction resources after the virtual character interaction scene ends for a preset duration, thereby realizing the proper use of resources and avoiding waste. For example, the allocated battlefield resources may be recycled half an hour after the end of the e-sports competition. Because after this time period, viewing of the e-sports competition is certainly completed, and there is no need to re-enter the simulated battle battlefield that simulates the e-sports competition.

According to the foregoing virtual character interaction method, when the viewing-only picture of the virtual character interaction scene is displayed, the viewing-only picture can be switched to the virtual character simulation interaction interface in response to the interaction simulation operation triggered during displaying of the viewing-only picture. Therefore, when the viewing user views the virtual character interaction scene, simulation of the virtual characters in the virtual character interaction scene can be switched, and the scene status of the interaction between the virtual characters can be displayed. The user may then control the simulated virtual character to perform corresponding actions, so that the user can participate in the simulation interaction of the viewed virtual character interaction scene. Compared with the conventional virtual character interaction scene that can only be viewed, participation in the simulation interaction of the viewed virtual character interaction scene can be switched during user viewing, which improves the interactivity and reduces the limitation.

In an embodiment, the switching from the viewing-only picture to a virtual character simulation interaction interface in response to an interaction simulation operation triggered during displaying of the viewing-only picture includes: displaying a simulation interaction information setting interface in response to the interaction simulation operation triggered during displaying of the viewing-only picture; obtaining simulation interaction information inputted in the simulation interaction information setting interface; and allocating simulation interaction resources according to the simulation interaction information, and displaying the virtual character simulation interaction interface according to the simulation interaction resources.

The simulation interaction information is information used for simulating interaction between the virtual characters in the virtual character interaction scene. That is, through the simulation interaction information, the interaction between the virtual characters in the virtual character interaction scene can be simulated. The simulation interaction information setting interface is an interface for setting the simulation interaction information.

In an embodiment, the simulation interaction information may include at least one of an identifier of a target virtual character, a selected friend identifier, or a difficulty level set for an opposing virtual character.

The target virtual characters are designated simulated virtual characters controlled by real users. The selected friend identifier is an identifier of a friend user selected by the viewing user to perform simulation interaction together. The opposing virtual character is a virtual character controlled by a non-real user in the virtual interaction scene and having an opposing relationship with the target virtual character. For example, in an e-sports competition, each team has a total of five game characters, and the viewing user invites two friends to simulate the e-sports competition for a game battle. Therefore, a total of seven game characters in the virtual character simulation interaction interface are played by robot models (that is, seven game characters that are not controlled by non-real users).

There are two game characters played by the robot models in the team of the viewing user, and the remaining five game characters are opposing virtual characters.

The target virtual characters may only include the simulated virtual character designated by the viewing user, and may alternatively include the simulated virtual character designated by the viewing user and simulated virtual characters designated by the friend users corresponding to the friend identifiers selected by the viewing user.

Specifically, when the viewing user triggers the interaction simulation operation, the terminal displays the simulation interaction information setting interface in response to the interaction simulation operation. The terminal may display simulation interaction setting options in the simulation interaction information setting interface, and obtain customized simulation interaction information inputted by the viewing user (for example, input operations such as selection or filling) corresponding to each simulation interaction setting option. The terminal may allocate simulation interaction resources according to the simulation interaction information, and generate and display the virtual character simulation interaction interface according to the simulation interaction resources.

The simulation interaction setting option is an option to customize the simulation interaction setting. The simulation interaction resources are resource information for realizing the virtual character simulation interaction interface.

In an embodiment, the simulation interaction setting options may include at least one of a target virtual character setting option, a friend invitation option, a difficulty level setting option for an opposing virtual character, or the like. The target virtual character setting option is used for setting a target virtual character, that is, to specify which virtual character to operate in the virtual character interaction scene (for example, to select which game character to operate in an e-sports competition). The friend invitation option is used for determining whether to invite friends to simulate the interaction and determining friends who are invited to simulate the interaction (for example, choose whether to invite friends to simulate an e-sports competition for an actual game battle). The difficulty level setting option of an opposing virtual character is used for setting a difficulty level for the opposing virtual character (for example, selecting a difficulty level for non-human robots).

In an embodiment, the simulation interaction resources may include at least one of resources for simulating virtual characters, a simulation interaction room, or the like. The resources for simulating virtual characters may include resources for simulating target virtual characters (that is, virtual characters controlled by real users) and resources for non-target virtual characters (that is, virtual characters controlled by non-real users, such as robot models).

In an embodiment, the terminal may create an exclusive simulation interaction room for a viewing user according to customized simulation interaction information inputted by the viewing user, and allocate corresponding simulation interaction resources. For example, in a battle game scene, an exclusive battlefield may be created and corresponding battle resources are allocated. Therefore, the terminal may simulate, in the virtual character simulation interaction interface, virtual characters in the virtual character interaction scene, and display a scene status of interaction between the virtual characters.

In an embodiment, the terminal may locally allocate simulation interaction resources according to the simulation interaction information, thereby generating and displaying the virtual character simulation interaction interface. In another embodiment, the terminal may alternatively send simulation interaction information to the server, and the server allocates simulation interaction resources according to the simulation interaction information and generates a virtual character simulation interaction interface. The server returns the generated virtual character simulation interaction interface to the terminal for display.

In an embodiment, the viewing-only picture is a video viewing-only picture displayed by a video application. In response to the interaction simulation operation, the terminal may start the virtual character interaction application, and display the simulation interaction information setting interface through the virtual character interaction application. In another embodiment, the terminal may alternatively directly display the simulation interaction information setting interface in the video application. It may be understood that, in another embodiment, the viewing-only picture, the simulation interaction information setting interface, and the virtual character simulation interaction interface may all be displayed through the virtual character interaction application. The virtual character interaction application integrates a virtual character interaction scene viewing function, a simulation interaction information setting function, and an interaction simulation function.

In another embodiment, the terminal may alternatively directly obtain default simulation interaction information, and allocate simulation interaction resources according to the default simulation interaction information, thereby generating and displaying a virtual character simulation interaction interface. The default simulation interaction information is simulation interaction information set by the system for the virtual character interaction scene by default. In this case, the default simulation interaction information may be obtained regardless of how many times the interaction simulation operation is responded to.

In the foregoing embodiment, the viewing user may customize the simulation interaction information, to allocate corresponding simulation interaction resources and perform simulation interaction, thereby improving the accuracy of simulation interaction, and avoiding resource waste caused by misallocation of resources.

In an embodiment, the switching from the viewing-only picture to a virtual character simulation interaction interface in response to an interaction simulation operation triggered during displaying of the viewing-only picture further includes: performing the operation of displaying a simulation interaction information setting interface when responding for the first time to the interaction simulation operation triggered during displaying of the viewing-only picture; obtaining the reserved allocated simulation interaction resources when responding not for the first time to the interaction simulation operation triggered during displaying of the viewing-only picture; and displaying the virtual character simulation interaction interface according to the reserved simulation interaction resources.

It may be understood that, when responding for the first time to the interaction simulation operation triggered during displaying of the viewing-only picture, the simulation interaction information setting interface may be displayed, so that the user inputs customized simulation interaction information in the simulation interaction information setting interface. However, when responding not for the first time to the interaction simulation operation, it means that the virtual character simulation interaction interface has been switched before, and it means that simulation interaction resources for implementing the virtual character simulation interaction interface have been allocated before. The terminal may reserve the allocated simulation interaction resources, and when responding to the interaction simulation operation again, the terminal may directly obtain the reserved allocated simulation interaction resources, and display the virtual character simulation interaction interface according to the reserved simulation interaction resources.

Specifically, the terminal may enter a created and reserved simulation interaction room, and display the virtual character simulation interaction interface after entering the simulation interaction room according to the reserved resources for simulating the virtual characters.

In the foregoing embodiment, when returning to view, the allocated simulation interaction resources are reserved, so that when the simulation interaction is entered again, the simulation interaction can be quickly performed according to the reserved simulation interaction resources, which avoids the cumbersome operation caused by re-customization of input simulation interaction information by the user, thereby improving the efficiency of simulation interaction.

In an embodiment, the obtaining simulation interaction information inputted in the simulation interaction information setting interface includes: displaying, in the simulation interaction information setting interface, identifiers of the virtual characters in the virtual character interaction scene; and determining identifiers of target virtual characters selected from the identifiers of the virtual characters, where the target virtual characters are designated simulated virtual characters controlled by real users.

It may be understood that, the identifier of the selected target virtual character is included in the simulation interaction information.

Specifically, the terminal may display, in the simulation interaction information setting interface, identifiers of the virtual characters in the virtual character interaction scene. The viewing user may specify an identifier of a simulated virtual character from the identifiers as an identifier of a target virtual character.

In an embodiment, when the viewing user chooses to invite friends to use the virtual characters for simulation interaction, the identifiers of the target virtual characters may further include identifiers of virtual characters corresponding to friend identifiers of the invited friend users. It may be understood that, since virtual characters represented by the identifiers of the virtual characters corresponding to the friend identifiers are virtual characters controlled by the friend users, which are virtual characters controlled by real users and are thus target virtual characters.

The identifiers of the virtual characters corresponding to the friend identifiers may be the identifiers of the virtual characters selected by the friend users to control, or may be identifiers of the virtual characters allocated to the friend identifiers by the terminal or the server from the identifiers of the remaining virtual characters (that is, virtual characters other than the virtual character selected by the viewing user in the virtual character interaction scene).

In the foregoing embodiment, the viewing user may customize and designate the target virtual characters to be simulated in the viewing virtual character interaction scene, which improves the pertinence and accuracy of the simulation interaction.

In an embodiment, the method further includes: displaying a friend invitation entrance in the simulation interaction information; displaying, in response to a trigger operation on the friend invitation entrance, a friend identifier set corresponding to a viewing user of the viewing-only picture; and determining a friend identifier selected from the friend identifier set. In an embodiment, the determining identifiers of target virtual characters selected from the identifiers of the virtual characters includes: obtaining the identifiers of the target virtual characters according to an identifier of a virtual character selected by the viewing user from the identifiers of the virtual characters and an identifier of a virtual character corresponding to the friend identifier.

The friend identifier is an identifier of a friend user of the viewing user. The displayed friend identifier set may be some or all friend identifiers corresponding to the viewing user in the virtual character interaction application or an associated application of the virtual character interaction application.

In an embodiment, the displayed friend identifier set may be friend identifiers that currently meet an invitation condition. The invitation condition may include at least one of a level in the virtual character interaction application meeting a preset level, being in an idle state, being in an online state, or the like.

Specifically, the viewing user may trigger the friend invitation entrance, and the terminal displays a friend list of the viewing user, where the friend list includes at least one friend identifier. The user may select, from the friend list, friend identifiers to control virtual characters together for simulation interaction, and the terminal may obtain the selected friend identifiers. It may be understood that, the selected friend identifiers are included in the simulation interaction information.

In an embodiment, the terminal may send the friend identifiers selected by the viewing user to the server, and the server sends invitation information to the terminals corresponding to the friend identifiers. After the friend users accept the invitation, the selected friend identifiers are added to a room where the user identifier corresponding to the viewing user is located that is used for setting the simulation interaction information, so that the invited friend users may view the identifiers of the virtual characters in the virtual character interaction scene. Further, the invited friend users (that is, the friend users corresponding to the selected friend identifiers) may select the identifiers of the virtual characters to be simulated and controlled. It may be understood that, the identifiers of the virtual characters selected by the friend users are also identifiers of target virtual characters. The server may send the identifiers of the virtual characters selected by the friend users to the terminal used by the viewing user, and the terminal used by the viewing user may display the friend identifiers and the identifiers of the selected virtual characters in association.

In an embodiment, the identifiers of the virtual characters corresponding to the friend identifiers may not be selected by the friend users, and the terminal or the server may allocate identifiers of the virtual characters to the friend identifiers from the identifiers of the remaining virtual characters (that is, virtual characters other than the virtual character selected by the viewing user in the virtual character interaction scene).

It may be understood that, the terminal or the server may randomly allocate identifiers of corresponding virtual characters to the friend identifiers from the identifiers of the remaining virtual characters. The terminal or the server may alternatively allocate identifiers of virtual characters matching a control style of the friend users corresponding to the friend identifiers from the identifiers of the remaining virtual characters according to a virtual character historical control record corresponding to each friend identifier.

In the foregoing embodiment, the viewing user may customize and invite friend users to perform simulation interaction together, which not only improves the interactivity at the social level, but also improves the pertinence of the simulation interaction. Further, the accuracy of resource allocation is improved.

In an embodiment, the simulating, in the virtual character simulation interaction interface, virtual characters in the virtual character interaction scene includes: simulating and displaying, in the virtual character simulation interaction interface, the target virtual characters corresponding to the identifiers of the target virtual characters, and displaying virtual characters that are controlled by non-real users and allocated to identifiers of non-target virtual characters, where the non-target virtual characters are virtual characters other than the target virtual characters in the virtual character interaction scene. It may be understood that, since the target virtual characters are controlled by real users, the non-target virtual characters are virtual characters that do not require control by real users. A virtual character controlled by a non-real user is a virtual character that interacts spontaneously and is not controlled by a real user.

In an embodiment, a virtual character controlled by a non-real user may be a trained robot model. That is, the robot model acts as a virtual character.

Specifically, the terminal may simulate and display, in the virtual character simulation interaction interface, the target virtual characters corresponding to the identifiers of the target virtual characters. The terminal may further display virtual characters that are controlled by non-real users and allocated to identifiers of non-target virtual characters.

It may be understood that, for a battle scene, each of opposing parties may include a non-target virtual character. That is, identifiers of vacant virtual characters that are not designated and simulated by real users in each of the opposing parties are all identifiers of non-target virtual characters, and virtual characters controlled by non-real users may be allocated to the identifiers of the non-target virtual characters.

In the foregoing embodiment, the virtual characters controlled by non-real users allocated to the identifiers of the non-target virtual characters, for example, intelligently allocated robot models, ensure the feasibility and the success rate of simulation interaction, and prevent failure of the simulation interaction since the user cannot invite enough people for a long time, thereby avoiding the waste of pre-preparation resources caused by the failure of the simulation interaction. That is, by ensuring the success of the simulation interaction, the proper use of resources is realized, and the waste of resources caused by invalid operations is avoided.

In an embodiment, the displaying virtual characters that are controlled by non-real users and allocated to identifiers of non-target virtual characters includes: determining objects that control the non-target virtual characters in the virtual character interaction scene; obtaining the virtual characters that are controlled by non-real users and allocated to the identifiers of the non-target virtual characters, and conform to control styles of the objects; and displaying, in the virtual character simulation interaction interface, the virtual characters controlled by the non-real users.

The objects that control the non-target virtual characters in the virtual character interaction scene refer to objects that control the non-target virtual characters in the viewed virtual character interaction scene.

Specifically, the terminal may determine control styles of the objects that control the non-target virtual characters in the virtual character interaction scene, and obtain the virtual characters that are controlled by non-real users and allocated to the identifiers of the non-target virtual characters, and conform to the control styles of the objects. The terminal may display, in the virtual character simulation interaction interface, the virtual characters that are controlled by non-real users and conform to the control styles of the objects.

For example, in an e-sports competition, each team has a total of five game characters, and the viewing user invites two friends to simulate the e-sports competition for a game battle. Therefore, a total of seven game characters in the virtual character simulation interaction interface are played by robot models (that is, seven game characters that are not controlled by non-real users). Control styles of professional e-sports players controlling the seven game characters in previously viewed e-sports competitions may be determined, to allocate robot models that respectively match the control styles of the professional e-sports players to act as the seven game characters. In this way, the robot models can reflect the personal characteristics of each e-sports player as much as possible, so that the viewing user feels that the user is really fighting against high-end e-sports players.

In the foregoing embodiment, the authenticity and pertinence of the simulation interaction are improved, and the limitation caused by the unified allocation is avoided, thereby improving the accuracy of resource allocation and improving the effect of the simulation interaction.

In an embodiment, the non-target virtual characters include opposing virtual characters having an opposing interaction relationship with the target virtual characters. In this embodiment, the displaying virtual characters that are controlled by non-real users and allocated to identifiers of non-target virtual characters includes: determining, in a case that at least one real user who controls the target virtual character is a professional competitive user, a virtual character that is controlled by a non-real user and whose difficulty level matches the professional competitive user; and allocating the virtual character controlled by the non-real user to the opposing virtual characters.

The opposing interaction relationship refers to an interaction relationship that is opposing, that is, an opposing relationship of not belonging to the same team or the same camp.

The professional competitive users are users with professional competitive skills. In an embodiment, the professional competitive users may be professional e-sports players.

Specifically, when a professional competitive user wants to control a virtual character for simulation interaction after viewing the virtual character interaction scene, the terminal may automatically allocate virtual characters controlled by non-real users of a difficulty level that matches the professional competitive user to an opposing virtual character having an opposing interaction relationship with a target virtual character used by the professional competitive user. Therefore, the challenge difficult for the professional competitive user is increased.

In an embodiment, an account used by the professional competitive user to log in to the virtual character interaction application may carry a professional competitive identifier, and the terminal may identify the professional competitive user controlling the target virtual character according to whether the account logged in by the real user who controls the target virtual character carries the professional competitive identifier.

In an embodiment, the simulation interaction information setting interface may further include a professional competitive identity option, and the viewing user or the invited friend user may select a professional competitive identity in the professional competitive identity option. When terminal detects that the professional competitive identity option is selected, it may be learned that the viewing user or the invited friend user is a professional competitive user. The terminal may then allocate virtual characters controlled by non-real users of a difficulty level that matches the professional competitive user to the opposing virtual characters of the target virtual character used by the professional competitive user.

For ease of understanding, a description is made by using an example. Assuming that after finishing an e-sports competition, an e-sports player looks back at the video of the e-sports competition and wants to re-simulate the e-sports competition, an interaction simulation operation may be performed, simulation interaction information may be set, and the professional competitive identity option may be selected, to declare the identity as an e-sports player. In this case, in a game battlefield that simulates that e-sports competition, battle robot models with a higher difficulty level (higher than a difficulty level allocated to ordinary viewing users) are to be allocated. This is not limited to the e-sports players in the e-sports competitions viewed, and may be applied to any e-sports players who declare a professional competitive identity. That is, battle robot models with a higher difficulty level are allocated to a professional player. It may be understood that, the e-sports player may choose a target virtual character to control, that is, not limited to only controlling a virtual character controlled during the e-sports competition.

In the foregoing embodiment, for the professional competitive user, virtual characters controlled by non-real users of a difficulty level that matches the professional competitive user are allocated, which improves the pertinence of simulation interaction, avoids the limitation caused by unified allocation, and further improves the accuracy of resource allocation and the accuracy of the simulation interaction.

In an embodiment, the non-target virtual characters include opposing virtual characters having an opposing interaction relationship with the target virtual characters. In this embodiment, the obtaining simulation interaction information inputted in the simulation interaction information setting interface further includes: determining a difficulty level set for the opposing virtual characters in response to a difficulty level setting operation for the opposing virtual characters in the simulation interaction information setting interface. In this embodiment, the displaying virtual characters that are controlled by non-real users and allocated to identifiers of non-target virtual characters includes: displaying, in the virtual character simulation interaction interface, virtual characters that are controlled by non-real users and allocated to the opposing virtual characters controlled by non-real users, and conform to the difficulty level.

Specifically, the terminal may display a difficulty level setting option for the opposing virtual characters in the simulation interaction information setting interface. The viewing user may perform a difficulty level setting operation for the difficulty level setting option, to set a corresponding difficulty level for the opposing virtual characters. The terminal may allocate virtual characters that are controlled by non-real users and conforms to a difficulty level set for the opposing virtual characters. The terminal may display, in the virtual character simulation interaction interface, virtual characters that are controlled by non-real users and allocated to the opposing virtual characters controlled by non-real users, and conform to the difficulty level.

It may be understood that, a difficulty level is set for the opposing virtual characters, so that the allocated virtual characters (robot models) controlled by non-real users are more accurate, thereby improving the accuracy of resource allocation and avoiding the limitation of unified allocation.

In an embodiment, the viewing-only picture is a viewing-only picture of a video. Before step 204 of switching from the viewing-only picture to a virtual character simulation interaction interface in response to an interaction simulation operation triggered during displaying of the viewing-only picture, the method further includes: obtaining, in response to a playback progress adjustment operation on the video, a target time node after the adjustment. In this embodiment of this application, the displaying a scene status of interaction between the virtual characters in step 206 may include: displaying the scene status of the interaction between the virtual characters at the target time node.

The target time node refers to a start time point of the simulation interaction of the virtual character interaction scene. That is, the simulation interaction starts from the scene status at the target time node.

It may be understood that, the viewing user may alternatively start from the scene status at any moment in the viewed virtual character interaction scene to perform simulation interaction.

Specifically, the viewing user may adjust the playback progress of the video, and the terminal may obtain, in response to a playback progress adjustment operation on the video, a target time node after the adjustment. The viewing user may perform an interaction simulation operation. The terminal may switch from the viewing-only picture to the virtual character simulation interaction interface, and simulate, in the virtual character simulation interaction interface, virtual characters in the virtual character interaction scene, and display a scene status of interaction between the virtual characters at the target time node.

In an embodiment, the viewing user may drag the progress bar of the video to the target time node. In this way, the scene status dragged to any moment may be customized as the initial status of the simulation interaction.

Figure 6:
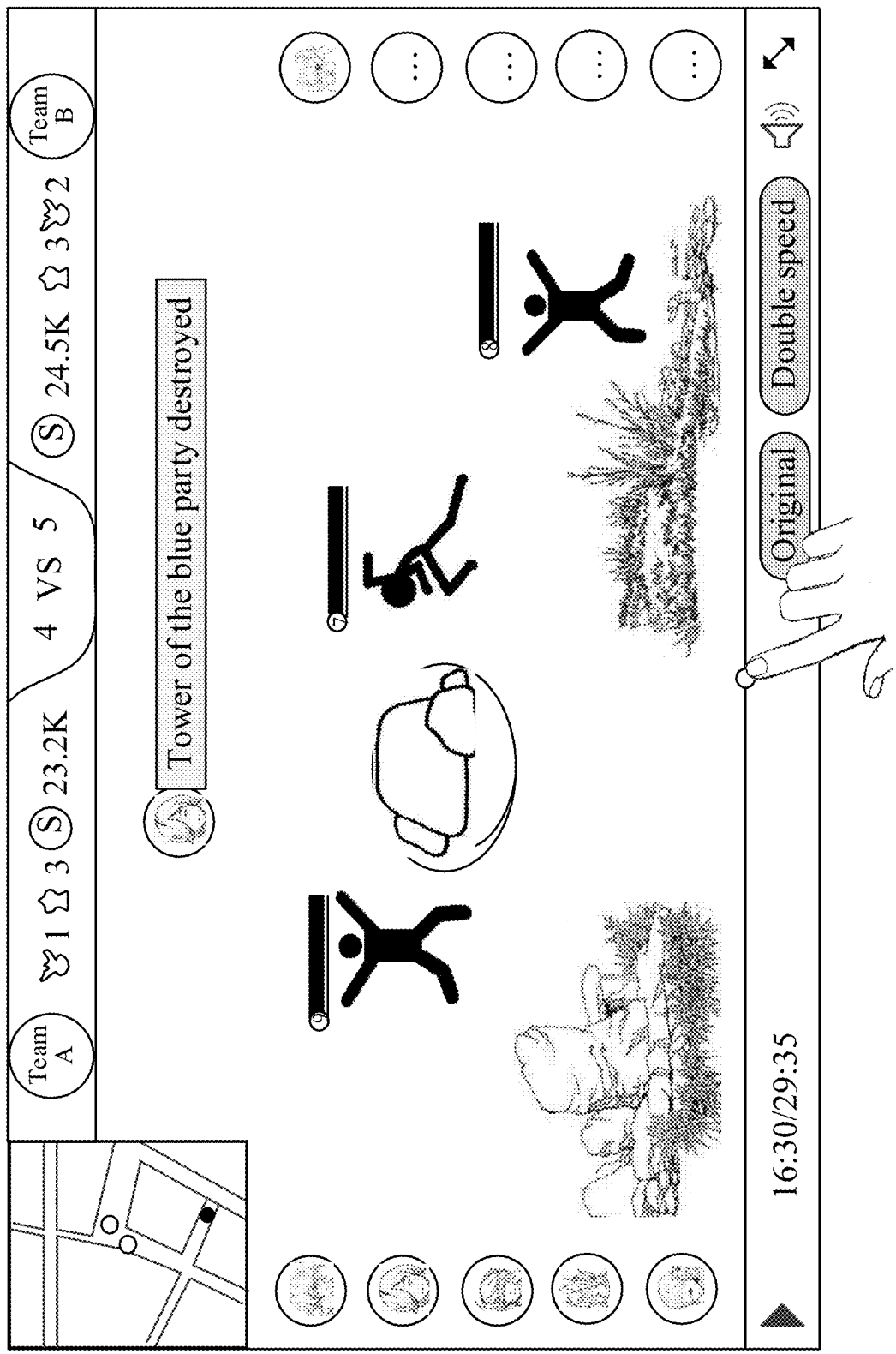
FIG. 6 is a schematic diagram of selecting a start moment of simulation interaction in an embodiment.

Referring to FIG. 6, the viewing user may drag the progress bar to 16:30, and start the simulated battle from 16:30, that is, a battle state when the viewing user starts the battle is a game status at 16:30 of the e-sports competition.

In the foregoing embodiment, the viewing user may customize and specify a time point at which the simulation interaction is to be started, which improves the pertinence of the simulation interaction and avoids the limitation.

In an embodiment, the viewing-only picture is a viewing-only picture of a live video. The method further includes: obtaining a real-time live video stream of the live video in response to a viewing return operation triggered during displaying of the virtual character simulation interaction interface; and switching the virtual character simulation interaction interface to a viewing-only picture of a virtual character interaction scene corresponding to the real-time live video stream.

The viewing return operation refers to an operation of returning to view the live video, that is, returning from a simulation interaction state to the live video for viewing. The real-time live video stream is a real-time video stream of the live video, which can reflect the latest scene status of the virtual character interaction scene.

It may be understood that, when the viewing user controls the simulated virtual character in the virtual character simulation interaction interface to perform simulation interaction, the live video still continues, and then the scene status of the virtual character interaction scene in the live video changes. When the user wants to return to continue to view the live video, the virtual character interaction scene in the latest scene status may be switched for viewing.

Specifically, when the virtual character simulation interaction interface is displayed, the viewing user may trigger the viewing return operation. The terminal may obtain the real-time live video stream of the live video. The terminal may switch the virtual character simulation interaction interface to the video viewing-only picture of the virtual character interaction scene in the latest scene status according to the real-time live video stream.

In an embodiment, the terminal may determine a livestreaming progress time point when receiving the viewing return operation, and obtain a live video stream corresponding to the livestreaming progress time point.

In an embodiment, the terminal may obtain the real-time live video stream of the live video based on the 5G network, and switch the virtual character simulation interaction interface to a viewing-only picture of a virtual character interaction scene corresponding to the real-time live video stream. Therefore, the viewing-only picture of the live video can be quickly switched back In the foregoing embodiment, the viewing user may switch back to the viewing interface for viewing at any time, thereby avoiding the limitation. In addition, the virtual character simulation interaction interface is switched to a viewing-only picture of a virtual character interaction scene corresponding to the real-time live video stream, which can quickly switch back to the viewing-only picture in the latest status, and improves the accuracy of returning to viewing.

Figure 7:
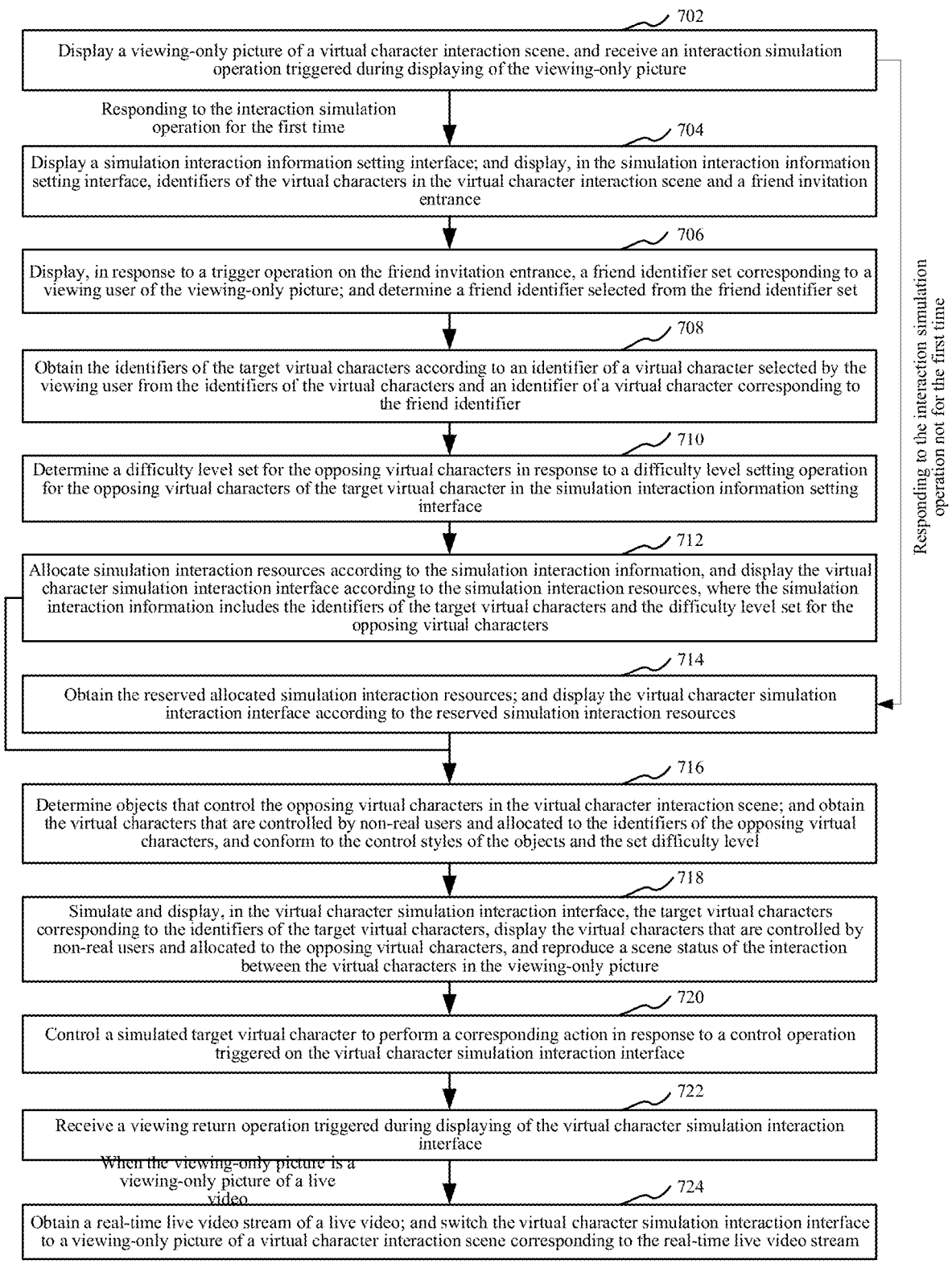
FIG. 7 is a schematic flowchart of a virtual character interaction method in another embodiment.

As shown in FIG. 7, in an embodiment, a virtual character interaction method is provided. The virtual character interaction method may be performed by a terminal, or may be performed jointly by a terminal and a server. The method further includes the following steps:

Step 702: Display a viewing-only picture of a virtual character interaction scene, and receive an interaction simulation operation triggered during displaying of the viewing-only picture.

Step 704 is performed when responding for the first time to the interaction simulation operation triggered during displaying of the viewing-only picture, and step 714 is performed when responding not for the first time to the interaction simulation operation triggered during displaying of the viewing-only picture.

Step 704: Display a simulation interaction information setting interface. The simulation interaction information setting interface displays identifiers of the virtual characters in the virtual character interaction scene and a friend invitation entrance.

Step 706: Display, in response to a trigger operation on the friend invitation entrance, a friend identifier set corresponding to a viewing user of the viewing-only picture; and determine a friend identifier selected from the friend identifier set.

Step 708: Obtain the identifiers of the target virtual characters according to an identifier of a virtual character selected by the viewing user from the identifiers of the virtual characters and an identifier of a virtual character corresponding to the friend identifier.

Step 710: Determine a difficulty level set for the opposing virtual characters in response to a difficulty level setting operation for the opposing virtual characters of the target virtual character in the simulation interaction information setting interface.

Step 712: Allocate simulation interaction resources according to the simulation interaction information, and display the virtual character simulation interaction interface according to the simulation interaction resources. The simulation interaction information includes the identifiers of the target virtual characters and the difficulty level set for the opposing virtual characters.

Step 714: Obtain the reserved allocated simulation interaction resources; and display the virtual character simulation interaction interface according to the reserved simulation interaction resources.

Step 716: Determine objects that control the opposing virtual characters in the virtual character interaction scene; and obtain the virtual characters that are controlled by non-real users and allocated to the identifiers of the opposing virtual characters, and conform to the control styles of the objects and the set difficulty level.

Step 718: Simulate and display, in the virtual character simulation interaction interface, the target virtual characters corresponding to the identifiers of the target virtual characters, display the virtual characters that are controlled by non-real users and allocated to the opposing virtual characters, and reproduce a scene status of the interaction between the virtual characters in the viewing-only picture.

Step 720: Control the simulated target virtual character to perform a corresponding action in response to a control operation triggered on the virtual character simulation interaction interface by the user of the computer device.

Step 722: Receive a viewing return operation triggered during displaying of the virtual character simulation interaction interface. When the viewing-only picture is a viewing-only picture of a live video, step 724 is performed, and when the viewing-only picture is a viewing-only picture of playing a video file, a viewing-only picture when receiving the interaction simulation operation is returned.

Step 724: Obtain a real-time live video stream of a live video; and switch the virtual character simulation interaction interface to a viewing-only picture of a virtual character interaction scene corresponding to the real-time live video stream.

This application further provides an application scenario. Specifically, the virtual character interaction method may be applied to an e-sports competition viewing scene. A viewing user of the e-sports competition may view the picture of the e-sports competition through the live video of the e-sports game on the video platform or a playback video file of the e-sports competition. When the viewing user wants to simulate the e-sports competition and participate in a battle game while viewing the e-sports competition, a simulated battle operation may be triggered for the viewing interface, to switch the e-sports competition viewing state to a simulated battle state.

The terminal may call a game application used in the e-sports competition or an installed video platform application to generate an interface for setting simulated battle options. In this case, the user may initialize the entered simulated battle state. The options that may be set include but are not limited to: selecting a hero character to be controlled in the e-sports competition; determining whether to invite friend users to conduct an e-sports battle; selecting a difficulty level of non-human robots (that is, opposing virtual characters controlled by non-real users), or the like.

The terminal may create a simulated battle battlefield (that is, a simulation interaction room) according to the simulated battle option set by the viewing user, and allocate resources for the battle, to allocate a game character to be controlled for the viewing user, and allocate non-human battle robots with game styles of the e-sports players in the e-sports competition viewed for the viewing user. That is, the allocated non-human battle robots have the game styles of the e-sports players of characters represented by the battle robots in the e-sports competition. For example, in a simulated battle, a hero character 1 is a character that is not controlled by a real user. Therefore, a game style (that is, a control style) of an e-sports player A who controls the hero character 1 in the e-sports competition may be determined. Therefore, during the simulated battle, a non-human battle robot with this game style is allocated to represent the hero character 1. It may be understood that, when the viewing user chooses to invite friends to play the e-sports battle, the terminal may further display a friend list for the user to select friend users to invite. Game characters to be controlled may be further allocated to the friend users. When the viewing user sets a difficulty level of a non-human battle robot, the allocated non-human battle robot may have a game style of the e-sports player in the viewed e-sports competition and conform to the set difficulty level.

It may be understood that, when the user who controls the simulated game character is a professional e-sports player (not limited to the players in the viewed e-sports competition), the user may check the option indicating the identity of a professional e-sports player, so that non-human battle robots with a higher difficulty level may be allocated, thereby realizing differentiated and adaptive resource allocation for ordinary users and professional e-sports players, and improving the accuracy of resource allocation.

The terminal may display a simulated battle interface (that is, a virtual character simulation interaction interface) through the game application, and the viewing user may control the game character based on the interface to simulate the battle. The initial simulated battle interface may be a simulated battle interface in the initialized scene status, that is, an initial battle interface when the simulated e-sports competition has just started and the battle has not started. That is, the viewing user may simulate the game characters in the e-sports competition without following the current status of the e-sports competition to start a new competition game. The interface of the initial simulated battle may further reproduce the game status of the e-sports competition when a simulated battle operation is received. That is, the game status of the e-sports competition when the simulated battle operation is received is considered as the starting status for the viewing user to conduct the simulated battle. In other words, in the current status of the e-sports competition, the viewing user starts the simulated battle. For example, in the e-sports competition, there is a lack of blood and hero casualties. The user starts the simulated battle in this case of insufficient blood and hero casualties.

The user may drag the playback progress bar to any moment to start the simulated battle. Further, the initial simulated battle interface may display the game status at the dragged moment. That is, the user uses the game status at the dragged time as the start status of the simulated battle.

When the viewing user does not want to simulate the battle, but wants to return to viewing the e-sports competition, a close button or a viewing return control on the simulated battle picture may be clicked to return to the e-sports competition picture to continue viewing. When the user views an e-sports competition live video, a current real-time live video stream may be obtained, to return to viewing an e-sports competition picture in the latest game status. When the user views a replayed video of the e-sports competition, the user may return to the viewing-only picture paused when entering the simulated battle.

When the viewing user returns to view the e-sports competition, the allocated resources for the simulated battle may be reserved. When the viewing user does not want to view the e-sports competition again, but wants to play a simulated battle again, the viewing user can quickly return to the battlefield for the simulated battle based on the reserved simulated battle resources.

The switching processing of switching from the viewing-only picture of the e-sports competition to the picture of the simulated battle, and the switching processing of returning from the picture of the simulated battle to the viewing-only picture of the e-sports competition can both be realized through the 5G network, to achieve fast switching.

This application further provides an application scenario. Specifically, the virtual character interaction method may be applied to a scenario of viewing a level-breaking game. A level-breaking game may be a game in which game characters are controlled to break through levels. A viewing user may view a picture of the game through a live video or a playback video file of the level-breaking game. When the viewing user wants to simulate and participate in the level-breaking game during viewing, a simulated level-breaking operation may be triggered on the viewing interface to switch the viewing state to the simulated level-breaking status, so that the viewing user can control a game character to conduct the level-breaking battle.

It is to be understood that, although the steps in the flowchart are sequentially shown according to indication of an arrow, the steps are not necessarily sequentially performed according to a sequence indicated by the arrow. Unless otherwise explicitly specified in this application, execution of the steps is not strictly limited, and the steps may be performed in other sequences. In addition, at least some steps in the flowcharts may include a plurality of steps or a plurality of stages. The steps or the stages are not necessarily performed at the same moment, but may be performed at different moments. The steps or the stages are not necessarily performed in sequence, but may be performed in turn or alternately with another step or at least some of steps or stages of the another step.

Figure 8:
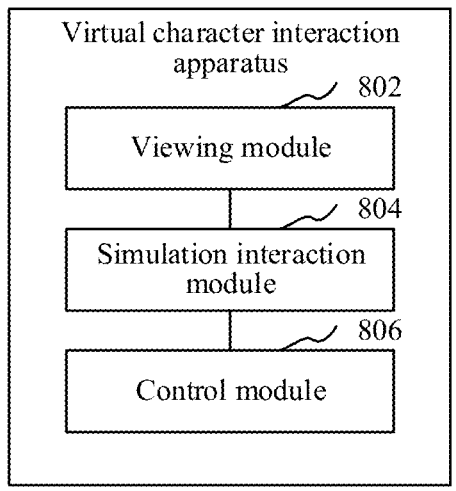
FIG. 8 is a block diagram of a virtual character interaction apparatus in an embodiment.

In an embodiment, as shown in FIG. 8, a virtual character interaction apparatus is provided, and the apparatus may use software modules or hardware modules, or a combination thereof to become a part of a computer device. The apparatus further includes: a viewing module 802, a simulation interaction module 804, and a control module 806, where the viewing module 802 is configured to display a viewing-only picture of a virtual character interaction scene;

the simulation interaction module 804 is configured to switch from the viewing-only picture to a virtual character simulation interaction interface in response to an interaction simulation operation triggered during displaying of the viewing-only picture; and simulate, in the virtual character simulation interaction interface, virtual characters in the virtual character interaction scene, the virtual characters including a simulated virtual character controlled by a user of the computer device, and display a scene status of interaction between the virtual characters; and the control module 806 is configured to control the simulated virtual characters to perform corresponding actions in response to a control operation triggered on the virtual character simulation interaction interface by the user of the computer device.

In an embodiment, the simulation interaction module 804 is further configured to: display a simulation interaction information setting interface in response to the interaction simulation operation triggered during displaying of the viewing-only picture; obtain simulation interaction information inputted in the simulation interaction information setting interface, where the simulation interaction information is information used for simulating interaction between the virtual characters in the virtual character interaction scene; and allocate simulation interaction resources according to the simulation interaction information, and display the virtual character simulation interaction interface according to the simulation interaction resources.

In an embodiment, the simulation interaction module 804 is further configured to: perform the operation of displaying a simulation interaction information setting interface when responding for the first time to the interaction simulation operation triggered during displaying of the viewing-only picture; obtain the reserved allocated simulation interaction resources when responding not for the first time to the interaction simulation operation triggered during displaying of the viewing-only picture; and display the virtual character simulation interaction interface according to the reserved simulation interaction resources.

In an embodiment, the simulation interaction module 804 is further configured to: display, in the simulation interaction information setting interface, identifiers of the virtual characters in the virtual character interaction scene; and determine identifiers of target virtual characters selected from the identifiers of the virtual characters, where the target virtual characters are designated simulated virtual characters controlled by real users.

In an embodiment, the simulation interaction module 804 is further configured to: display a friend invitation entrance in the simulation interaction information; display, in response to a trigger operation on the friend invitation entrance, a friend identifier set corresponding to a viewing user of the viewing-only picture; determine a friend identifier selected from the friend identifier set; and obtain the identifiers of the target virtual characters according to an identifier of a virtual character selected by the viewing user from the identifiers of the virtual characters and an identifier of a virtual character corresponding to the friend identifier.

In an embodiment, the simulation interaction module 804 is further configured to: simulate and display, in the virtual character simulation interaction interface, the target virtual characters corresponding to the identifiers of the target virtual characters, and display virtual characters that are controlled by non-real users and allocated to identifiers of non-target virtual characters, where the non-target virtual characters are virtual characters other than the target virtual characters in the virtual character interaction scene.

In an embodiment, the simulation interaction module 804 is further configured to: determine objects that control the non-target virtual characters in the virtual character interaction scene; obtain the virtual characters that are controlled by non-real users and allocated to the identifiers of the non-target virtual characters, and conform to control styles of the objects; and display, in the virtual character simulation interaction interface, the virtual characters controlled by the non-real users.

In an embodiment, the non-target virtual characters include opposing virtual characters having an opposing interaction relationship with the target virtual characters. The simulation interaction module 804 is further configured to: determine, in a case that at least one real user who controls the target virtual character is a professional competitive user, a virtual character that is controlled by a non-real user and whose difficulty level matches the professional competitive user; and allocate the virtual character controlled by the non-real user to the opposing virtual characters.

In an embodiment, the non-target virtual characters include opposing virtual characters having an opposing interaction relationship with the target virtual characters. the simulation interaction module 804 is further configured to: determine a difficulty level set for the opposing virtual characters in response to a difficulty level setting operation for the opposing virtual characters in the simulation interaction information setting interface; and display, in the virtual character simulation interaction interface, virtual characters that are controlled by non-real users and allocated to the opposing virtual characters controlled by non-real users, and conform to the difficulty level.

In an embodiment, the simulation interaction module 804 is further configured to: display an initialized scene status of the interaction between the virtual characters; or reproduce a scene status of the interaction between the virtual characters in the viewing-only picture.

In an embodiment, the viewing-only picture is a viewing-only picture of a video. The simulation interaction module 804 is further configured to: obtain, in response to a playback progress adjustment operation on the video, a target time node after the adjustment; and display the scene status of the interaction between the virtual characters at the target time node.

Figure 9:
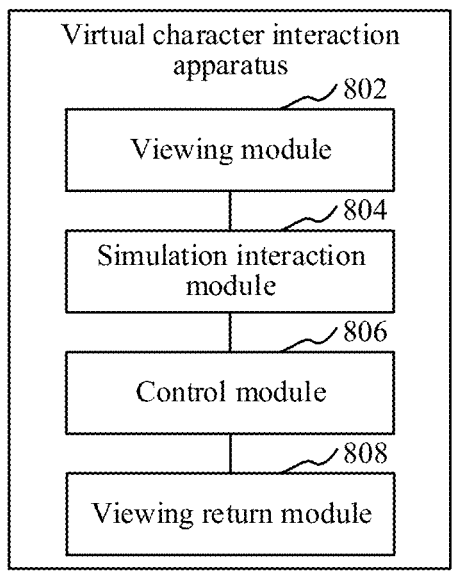
FIG. 9 is a block diagram of a virtual character interaction apparatus in another embodiment.

As shown in FIG. 9, in an embodiment, the apparatus further includes:

a viewing return module 808, configured to: obtain a real-time live video stream of the live video in response to a viewing return operation triggered during displaying of the virtual character simulation interaction interface; and switch the virtual character simulation interaction interface to a viewing-only picture of a virtual character interaction scene corresponding to the real-time live video stream.

According to the foregoing virtual character interaction apparatus, when the viewing-only picture of the virtual character interaction scene is displayed, the viewing-only picture can be switched to the virtual character simulation interaction interface in response to the interaction simulation operation triggered during displaying of the viewing-only picture. Therefore, when the viewing user views the virtual character interaction scene, simulation of the virtual characters in the virtual character interaction scene can be switched, and the scene status of the interaction between the virtual characters can be displayed. The user may then control the simulated virtual character to perform corresponding actions, so that the user can participate in the simulation interaction of the viewed virtual character interaction scene. Compared with the conventional virtual character interaction scene that can only be viewed, participation in the simulation interaction of the viewed virtual character interaction scene can be switched during user viewing, which improves the interactivity and reduces the limitation.

For a specific limitation on the virtual character interaction apparatus, reference may be made to the limitation on the virtual character interaction method above. Details are not described herein again. The modules in the foregoing virtual character interaction apparatus may be implemented entirely or partially by software, hardware, or a combination thereof. The foregoing modules may be built in or independent of a processor of a computer device in a hardware form, or may be stored in a memory of the computer device in a software form, so that the processor invokes and performs an operation corresponding to each of the foregoing modules.

In an embodiment, a computer device is provided. The computer device may be a terminal, and an internal structure diagram thereof may be shown in FIG. 10. The computer device includes a processor, a memory, a communication interface, a display screen, and an input apparatus that are connected by using a system bus. The processor of the computer device is configured to provide computing and control capabilities. The memory of the computer device includes a non-volatile storage medium and an internal memory. The non-volatile storage medium stores an operating system and computer-readable instructions. The internal memory provides an environment for running of the operating system and the computer-readable instructions in the non-volatile storage medium. The communication interface of the computer device is configured for wired or wireless communication with an external terminal, and the wireless communication may be realized by Wi-Fi, operator network, near field communication (NFC), or other technologies. The computer-readable instructions are executed by the processor to implement a virtual character interaction method. The display screen of the computer device may be a liquid crystal display screen or an electronic ink display screen. The input apparatus of the computer device may be a touch layer covering the display screen, or may be a key, a trackball, or a touch pad disposed on a housing of the computer device, or may be an external keyboard, a touch pad, a mouse, or the like.

Figure 10:
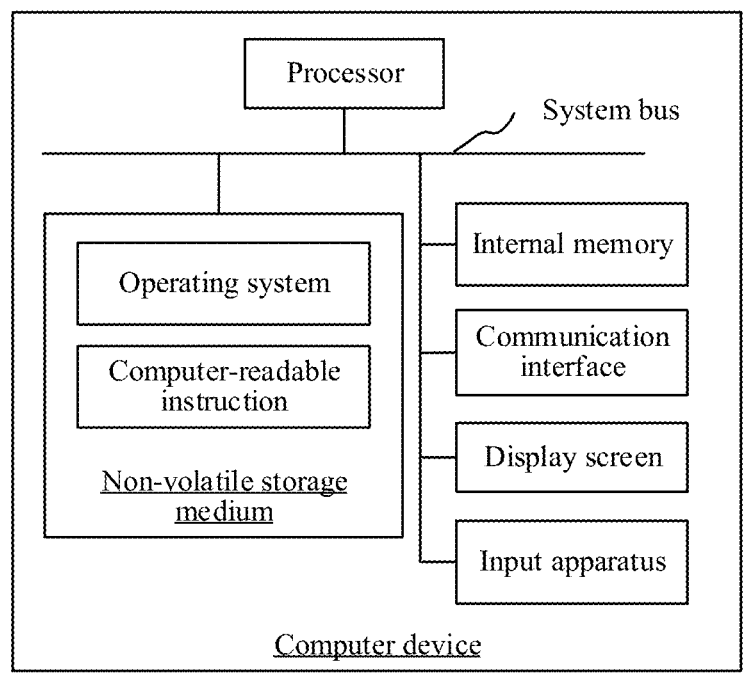
FIG. 10 is a diagram of an internal structure of a computer device in an embodiment.

A person skilled in the art may understand that, the structure shown in FIG. 10 is only a block diagram of a part of a structure related to a solution of this application and does not limit the computer device to which the solution of this application is applied. Specifically, the computer device may include more or fewer members than those in the drawings, or include a combination of some members, or include different member layouts.

In an embodiment, a computer device is provided, including a memory and a processor, the memory storing computer-readable instructions, the processor, when executing the computer-readable instructions, implementing the steps in the foregoing method embodiments.

In an embodiment, one or more computer-readable storage media are provided, storing computer-readable instructions, the computer-readable instructions, when executed by a processor, implementing the steps in the foregoing method embodiments.

In an embodiment, a computer-readable instruction product is provided, where the computer-readable instruction product or the computer-readable instruction includes computer instructions, and the computer instructions are stored in a computer-readable storage medium. A processor of a computer device reads the computer instructions from the computer-readable storage medium, and the processor executes the computer instructions, to cause the computer device to perform the steps in the foregoing method embodiments.

It may be understood that, the "plurality" in the embodiments of this application refers to at least two.

A person of ordinary skill in the art may understand that all or some of the procedures of the methods of the foregoing embodiments may be implemented by computer-readable instructions instructing relevant hardware. The computer-readable instructions may be stored in a non-volatile computer-readable storage medium. When the computer-readable instructions are executed, the procedures of the embodiments of the foregoing methods may be included. Any reference to a memory, a storage, a database, or another medium used in the embodiments provided in this application may include at least one of a non-volatile memory and a volatile memory. The non-volatile memory may include a read-only memory (ROM), a magnetic tape, a floppy disk, a flash memory, an optical memory, and the like. The volatile memory may include a random access memory (RAM) or an external cache. For the purpose of description instead of limitation, the RAM is available in a plurality of forms, such as a static RAM (SRAM) or a dynamic RAM (DRAM).

Technical features of the foregoing embodiments may be randomly combined. To make description concise, not all possible combinations of the technical features in the foregoing embodiments are described. However, the combinations of these technical features shall be considered as falling within the scope recorded by this specification provided that no conflict exists.

The foregoing embodiments only describe several implementations of this application, which are described specifically and in detail, but cannot be construed as a limitation to the patent scope of this application. For a person of ordinary skill in the art, several transformations and improvements can be made without departing from the idea of this application. These transformations and improvements belong to the protection scope of this application. Therefore, the protection scope of the patent of this application shall be subject to the appended claims. In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

What is claimed is:

1. A virtual character interaction method, performed by a computer device, the method comprising:
    displaying a viewing-only picture of a virtual character interaction scene;
    switching from the viewing-only picture to a virtual character simulation interaction interface in response to an interaction simulation operation triggered during the displaying of the viewing-only picture, further including:
        when responding to the interaction simulation operation for a first time, obtaining simulation interaction information inputted in a simulation interaction information setting interface by a user of the computer device and allocating simulation interaction resources according to the user-provided simulation interaction information;
        when responding to the interaction simulation operation not for the first time, obtaining simulation interaction resources previously allocated for the user of the computer device; and
        displaying the virtual character simulation interaction interface according to the simulation interaction resources;
    simulating, in the virtual character simulation interaction interface, virtual characters in the virtual character interaction scene, and displaying a scene status of interaction between the virtual characters, wherein the virtual characters include a simulated virtual character controlled by a user of the computer device; and
    controlling the simulated virtual character to perform a corresponding action in response to a control operation triggered on the virtual character simulation interaction interface by the user of the computer device.

2. The method according to claim 1, wherein the obtaining simulation interaction information inputted in the simulation interaction information setting interface comprises:
    displaying, in the simulation interaction information setting interface, identifiers of the virtual characters in the virtual character interaction scene; and
    determining identifiers of target virtual characters selected from the identifiers of the virtual characters by the user of the computer device, wherein the target virtual characters are designated simulated virtual characters controlled by real users.

3. The method according to claim 2, further comprising:
    displaying a friend invitation entrance in the simulation interaction information;
    displaying, in response to a trigger operation on the friend invitation entrance by the user of the computer device, a friend identifier set corresponding to a viewing user of the viewing-only picture; and determining a friend identifier selected from the friend identifier set by the user of the computer device; and the determining an identifier of a target virtual character selected from the identifiers of the virtual characters comprises:

obtaining the identifiers of the target virtual characters according to an identifier of a virtual character selected by the user of the computer device from the identifiers of the virtual characters and an identifier of a virtual character corresponding to the friend identifier.

4. The method according to claim 2, wherein the simulating, in the virtual character simulation interaction interface, virtual characters in the virtual character interaction scene comprises:

simulating and displaying, in the virtual character simulation interaction interface, the target virtual characters corresponding to the identifiers of the target virtual characters, and displaying virtual characters that are controlled by non-real users and allocated to identifiers of non-target virtual characters, wherein the non-target virtual characters are virtual characters other than the target virtual characters in the virtual character interaction scene.

5. The method according to claim 4, wherein the displaying virtual characters that are controlled by non-real users and allocated to identifiers of non-target virtual characters comprises:

obtaining the virtual characters that are controlled by non-real users and allocated to the identifiers of the non-target virtual characters, and conform to control styles of the objects; and displaying, in the virtual character simulation interaction interface, the virtual characters controlled by the non-real users.

6. The method according to claim 4, wherein the non-target virtual characters comprise opposing virtual characters having an opposing interaction relationship with the target virtual characters; and the displaying virtual characters that are controlled by non-real users and allocated to identifiers of non-target virtual characters comprises:

determining, in a case that at least one real user who controls the target virtual character is a professional competitive user, a virtual character that is controlled by a non-real user and whose difficulty level matches the professional competitive user; and allocating the virtual character controlled by the non-real user to the opposing virtual characters.

7. The method according to claim 4, wherein the non-target virtual characters comprise opposing virtual characters having an opposing interaction relationship with the target virtual characters;

the obtaining simulation interaction information inputted in the simulation interaction information setting interface further comprises:

determining a difficulty level set for the opposing virtual characters in response to a difficulty level setting operation for the opposing virtual characters in the simulation interaction information setting interface; and the displaying virtual characters that are controlled by non-real users and allocated to identifiers of non-target virtual characters comprises:

displaying, in the virtual character simulation interaction interface, virtual characters that are controlled by non-real users and allocated to the opposing virtual characters controlled by non-real users, and conform to the difficulty level.

8. The method according to claim 1, wherein the displaying a scene status of interaction between the virtual characters comprises:

displaying an initialized scene status of the interaction between the virtual characters; or reproducing a scene status of the interaction between the virtual characters in the viewing-only picture.

9. The method according to claim 1, wherein the viewing-only picture is a viewing-only picture of a video;

the method further comprises:

before switching from the viewing-only picture to the virtual character simulation interaction interface in response to the interaction simulation operation triggered during displaying of the viewing-only picture:

obtaining, in response to a playback progress adjustment operation on the video, a target time node after the adjustment operation; and the displaying a scene status of interaction between the virtual characters comprises:

displaying the scene status of the interaction between the virtual characters at the target time node.

10. The method according to claim 1, wherein the viewing-only picture is a viewing-only picture of a live video; and the method further comprises:

obtaining a real-time live video stream of the live video in response to a viewing return operation triggered during displaying of the virtual character simulation interaction interface; and switching the virtual character simulation interaction interface to a viewing-only picture of a virtual character interaction scene corresponding to the real-time live video stream.

11. A computer device, comprising a memory and a processor, the memory storing computer-readable instructions, and the processor, when executing the computer-readable instructions, implementing a virtual character interaction method, the method comprising:

displaying a viewing-only picture of a virtual character interaction scene;

switching from the viewing-only picture to a virtual character simulation interaction interface in response to an interaction simulation operation triggered during the displaying of the viewing-only picture, further including:

when responding to the interaction simulation operation for a first time, obtaining simulation interaction information inputted in a simulation interaction information setting interface by a user of the computer device and allocating simulation interaction resources according to the user-provided simulation interaction information;

when responding to the interaction simulation operation not for the first time, obtaining simulation interaction resources previously allocated for the user of the computer device; and displaying the virtual character simulation interaction interface according to the simulation interaction resources;

simulating, in the virtual character simulation interaction interface, virtual characters in the virtual character interaction scene, and displaying a scene status of interaction between the virtual characters, wherein the virtual characters include a simulated virtual character controlled by a user of the computer device; and controlling the simulated virtual character to perform a corresponding action in response to a control operation triggered on the virtual character simulation interaction interface by the user of the computer device.

12. The computer device according to claim 11, wherein the obtaining simulation interaction information inputted in the simulation interaction information setting interface comprises:

displaying, in the simulation interaction information setting interface, identifiers of the virtual characters in the virtual character interaction scene; and determining identifiers of target virtual characters selected from the identifiers of the virtual characters by the user of the computer device, wherein the target virtual characters are designated simulated virtual characters controlled by real users.

13. The computer device according to claim 11, wherein the displaying a scene status of interaction between the virtual characters comprises:

displaying an initialized scene status of the interaction between the virtual characters; or reproducing a scene status of the interaction between the virtual characters in the viewing-only picture.

14. The computer device according to claim 11, wherein the viewing-only picture is a viewing-only picture of a video;

the method further comprises:

before switching from the viewing-only picture to the virtual character simulation interaction interface in response to the interaction simulation operation triggered during displaying of the viewing-only picture:

obtaining, in response to a playback progress adjustment operation on the video, a target time node after the adjustment operation; and the displaying a scene status of interaction between the virtual characters comprises:

displaying the scene status of the interaction between the virtual characters at the target time node.

15. The computer device according to claim 11, wherein the viewing-only picture is a viewing-only picture of a live video; and the method further comprises:

obtaining a real-time live video stream of the live video in response to a viewing return operation triggered during displaying of the virtual character simulation interaction interface; and switching the virtual character simulation interaction interface to a viewing-only picture of a virtual character interaction scene corresponding to the real-time live video stream.

16. One or more non-transitory computer-readable storage media, storing computer-readable instructions, the computer-readable instructions, when executed by a processor of a computer device, causing the computer device to implement a virtual character interaction method, the method comprising:

displaying a viewing-only picture of a virtual character interaction scene;

switching from the viewing-only picture to a virtual character simulation interaction interface in response to an interaction simulation operation triggered during the displaying of the viewing-only picture, further including:

when responding to the interaction simulation operation for a first time, obtaining simulation interaction information inputted in a simulation interaction information setting interface by a user of the computer device and allocating simulation interaction resources according to the user-provided simulation interaction information;

when responding to the interaction simulation operation not for the first time, obtaining simulation interaction resources previously allocated for the user of the computer device; and displaying the virtual character simulation interaction interface according to the simulation interaction resources;

simulating, in the virtual character simulation interaction interface, virtual characters in the virtual character interaction scene, and displaying a scene status of interaction between the virtual characters, wherein the virtual characters include a simulated virtual character controlled by a user of the computer device; and controlling the simulated virtual character to perform a corresponding action in response to a control operation triggered on the virtual character simulation interaction interface by the user of the computer device.

17. The non-transitory computer-readable storage media according to claim 16, wherein the obtaining simulation interaction information inputted in the simulation interaction information setting interface comprises:

displaying, in the simulation interaction information setting interface, identifiers of the virtual characters in the virtual character interaction scene; and determining identifiers of target virtual characters selected from the identifiers of the virtual characters by the user of the computer device, wherein the target virtual characters are designated simulated virtual characters controlled by real users.

18. The non-transitory computer-readable storage media according to claim 16, wherein the displaying a scene status of interaction between the virtual characters comprises:

displaying an initialized scene status of the interaction between the virtual characters; or reproducing a scene status of the interaction between the virtual characters in the viewing-only picture.

19. The non-transitory computer-readable storage media according to claim 16, wherein the viewing-only picture is a viewing-only picture of a video;

the method further comprises:

before switching from the viewing-only picture to the virtual character simulation interaction interface in response to the interaction simulation operation triggered during displaying of the viewing-only picture:

obtaining, in response to a playback progress adjustment operation on the video, a target time node after the adjustment operation; and the displaying a scene status of interaction between the virtual characters comprises:

displaying the scene status of the interaction between the virtual characters at the target time node.

20. The non-transitory computer-readable storage media according to claim 16, wherein the viewing-only picture is a viewing-only picture of a live video; and the method further comprises:

obtaining a real-time live video stream of the live video in response to a viewing return operation triggered during displaying of the virtual character simulation interaction interface; and switching the virtual character simulation interaction interface to a viewing-only picture of a virtual character interaction scene corresponding to the real-time live video stream.

* * * * *